United States Patent
Nakai et al.

(10) Patent No.: US 9,238,269 B2
(45) Date of Patent: Jan. 19, 2016

(54) END MILL AND SHANK STRUCTURE OF END MILL

(71) Applicant: NIKKEN KOSAKUSHO WORKS, LTD., Daito-shi (JP)

(72) Inventors: Eisaku Nakai, Daito (JP); Suguru Maemura, Daito (JP); Susumu Mikado, Daito (JP); Steve Eckersall, Rotherham (GB)

(73) Assignee: NIKKEN KOSAKUSHO WORKS, LTD., Daito-shi (JP)

( * ) Notice: Subject to any disclaimer, the term of this patent is extended or adjusted under 35 U.S.C. 154(b) by 275 days.

(21) Appl. No.: 13/657,921

(22) Filed: Oct. 23, 2012

(65) Prior Publication Data

US 2013/0322980 A1   Dec. 5, 2013

(30) Foreign Application Priority Data

Jun. 1, 2012   (GB) .................................. 1209796.0
Jun. 12, 2012   (JP) ................................ 2012-133149
Jun. 20, 2012   (JP) ................................ 2012-138416

(51) Int. Cl.
| | | |
|---|---|---|
| B23B 31/11 | (2006.01) |
| B23B 31/107 | (2006.01) |
| B23B 31/00 | (2006.01) |
| B23B 31/117 | (2006.01) |
| A61B 17/88 | (2006.01) |

(52) U.S. Cl.
CPC ........... *B23B 31/1075* (2013.01); *B23B 31/005* (2013.01); *B23B 31/117* (2013.01); *B23B 2231/0256* (2013.01); *B23B 2250/12* (2013.01); *Y10T 407/14* (2015.01); *Y10T 407/1948* (2015.01); *Y10T 409/30952* (2015.01)

(58) Field of Classification Search
CPC ................. B23B 31/11; B25D 17/088; B25D 2217/0034; Y10T 408/907
USPC ............................................... 407/11; 408/57
See application file for complete search history.

(56) References Cited

U.S. PATENT DOCUMENTS

| | | |
|---|---|---|
| 1,875,362 A | 9/1932 | Wells |
| 3,202,431 A | 8/1965 | Moody |
| 3,444,781 A | 5/1969 | Sunderman et al. |
| 3,557,419 A | 1/1971 | Flannery |
| 3,664,677 A | 5/1972 | Sunderman et al. |
| 3,811,694 A | 5/1974 | Dahlman et al. |

(Continued)

FOREIGN PATENT DOCUMENTS

| | | |
|---|---|---|
| DE | 102010024793 | 12/2011 |
| JP | S49-022676 A | 2/1974 |

(Continued)

OTHER PUBLICATIONS

Japanese Action in Japanese Patent Application No. 2012-138416, mailed Nov. 12, 2013, 2 pages, with English translation, 3 pages.

(Continued)

*Primary Examiner* — Will Fridie, Jr.
(74) *Attorney, Agent, or Firm* — W. F. Fasse

(57) ABSTRACT

In a shank portion of an end mill which is chucked by a tool holder, flat surfaces are formed at a plurality of circumferential positions in the outer periphery of the shank portion so that the flat surfaces abut on side lock bolts attached to a body of the tool holder.

8 Claims, 16 Drawing Sheets

(56) References Cited

U.S. PATENT DOCUMENTS

| | | | |
|---|---|---|---|
| 3,887,203 A | 6/1975 | Benjamin et al. | |
| 3,938,231 A | 2/1976 | Hopkins | |
| 4,166,711 A | 9/1979 | Kress et al. | |
| 4,630,980 A | 12/1986 | Kubo | |
| 4,648,755 A | 3/1987 | Stashko | |
| 4,717,292 A | 1/1988 | Phillips | |
| 4,721,423 A | 1/1988 | Kubo | |
| D308,874 S | 6/1990 | Tsujimura et al. | |
| D328,557 S | 8/1992 | Nishimura | |
| 5,158,408 A | 10/1992 | Naito | |
| 5,234,293 A | 8/1993 | Mena | |
| 5,882,150 A | 3/1999 | Furuta et al. | |
| 6,394,711 B1 * | 5/2002 | Brosius | 408/57 |
| 6,607,533 B2 | 8/2003 | Del Rio | |
| 6,726,412 B2 * | 4/2004 | Sugata et al. | 408/57 |
| 7,077,608 B2 | 7/2006 | Hartman | |
| 7,296,953 B2 * | 11/2007 | Kuenzel | 408/83 |
| D668,697 S | 10/2012 | Hsu | |
| D686,646 S | 7/2013 | Mikado et al. | |
| 8,721,235 B2 * | 5/2014 | Kretzschmann et al. | 408/231 |
| 8,753,046 B2 * | 6/2014 | Schneider et al. | 408/57 |
| D717,847 S | 11/2014 | Mikado et al. | |
| 2002/0067964 A1 | 6/2002 | Sekiguchi et al. | |
| 2003/0103819 A1 * | 6/2003 | Sugata et al. | 408/57 |
| 2007/0154272 A1 | 7/2007 | Wells et al. | |
| 2008/0089749 A1 | 4/2008 | Wells et al. | |
| 2009/0232610 A1 | 9/2009 | Takagi et al. | |
| 2011/0008113 A1 | 1/2011 | Abe | |
| 2011/0268515 A1 | 11/2011 | Horiike et al. | |
| 2012/0020749 A1 | 1/2012 | Maeda et al. | |
| 2012/0039678 A1 | 2/2012 | Nguyen et al. | |
| 2012/0301234 A1 | 11/2012 | Yamaguchi | |
| 2012/0321405 A1 | 12/2012 | Weisel | |
| 2013/0034394 A1 | 2/2013 | Hecht et al. | |
| 2013/0136547 A1 | 5/2013 | Kurokawa et al. | |
| 2015/0054233 A1 | 2/2015 | Nakai et al. | |

FOREIGN PATENT DOCUMENTS

| | | |
|---|---|---|
| JP | 53-092990 | 8/1978 |
| JP | 53-139683 | 11/1978 |
| JP | S58-173410 U | 11/1983 |
| JP | S60-190510 U | 12/1985 |
| JP | S61-016204 U | 1/1986 |
| JP | S62-113935 U | 7/1987 |
| JP | S62-198035 U | 12/1987 |
| JP | 63-097403 | 6/1988 |
| JP | S63-097404 U | 6/1988 |
| JP | 06-080507 U | 11/1994 |
| JP | 06-080509 | 11/1994 |
| JP | H09-216107 A | 8/1997 |
| JP | 2001-087969 | 4/2001 |
| JP | 2002-346864 | 12/2002 |
| WO | WO2010/110735 | 9/2010 |

OTHER PUBLICATIONS

Japanese Action in Japanese Patent Application No. 2013-161286, mailed Nov. 12, 2013, 6 pages, with English translation, 7 pages.

* cited by examiner

END MILL AND SHANK STRUCTURE OF END MILL

BACKGROUND OF THE INVENTION

1. Field of the Invention

The present invention relates to shank portions of end mills among cutters such as end mills and reamers, and tool holders that chuck the shank portion of the end mill.

2. Background Art

Conventionally, shank portions of cutters such as end mills and reamers, and tool holders that chuck the shank portion of the cutter are proposed in, e.g., Japanese Unexamined Patent Publication Nos. 2002-346864 and 2001-87969 and Japanese Utility Model Publication No. H06-80509. Such conventional tool holders include two side lock bolts. The shank portion of the cutter basically has a circular cross section, and two flat surfaces are formed in the outer periphery of the shank portion. By fastening the two side lock bolts, the tip ends of the side lock bolts abut on the flat surfaces, respectively, whereby the shank portion of the cutter is chucked.

SUMMARY OF INVENTION

The inventors found that there is still room for improvement in the shank portions of the conventional cutters. Since the two flat surfaces are provided at a predetermined circumferential position on the outer periphery of the shank portion so as to be aligned with each other, the shank portion is subjected to a specific radial pressing force from the side lock bolts. Since the shank portion is pressed in the specific radial direction by the side lock bolts, there is still room for improvement in chucking. Moreover, displacement of the axis may occur. Specifically, the axis of the shank portion may be displaced from a proper position.

In view of the above problems, it is an object of the present invention to provide a chucking structure improved over the conventional structures.

In order to achieve the above object, a shank structure of an end mill according to a first invention includes a shank portion that is chucked by a tool holder, wherein first and second flat surfaces are formed at different circumferential positions on an outer periphery of the shank portion so that the first and second flat surfaces abut on side lock bolts attached to a body of the tool holder.

According to the first embodiment, since the flat surfaces are formed at the different circumferential positions in the shank portion, the shank portion is subjected to a plurality of radial pressing forces from different directions from each other. Thus, the shank portion is not subjected to a specific radial pressing force from the side lock bolts, and a side lock bolt chucking mechanism improved over the conventional structures can be provided. The first invention does not exclude formation of an additional flat surface at a different circumferential position in addition to the first and second flat surfaces.

In a preferred embodiment of the first invention, at least one of the first and second flat surfaces is a surface tilted at a predetermined angle in a range of 1 to 10 degrees, both inclusive, with respect to an axis of the shank portion so as to face toward a tip end of the end mill. According to this embodiment, the pressing force that is applied from the side lock bolt to the flat surface of the shank portion includes a component toward an axial rear end, and biases the shank portion so as to insert the shank portion into the tool holder. Thus, the shank portion can be more reliably chucked. In a more preferred embodiment, the flat surface is a surface tilted at 5 degrees with respect to the axis of the shank portion so as to face toward the tip end of the end mill.

If the first and second flat surfaces are tilted at an angle of less than 1 degree with respect to the axis of the shank portion, the force that biases the shank portion so as to insert the shank portion into the tool holder is reduced. If the first and second flat surfaces are tilted at an angle of more than 10 degree with respect to the axis of the shank portion, the force that presses the shank portion in the radial direction is reduced. In another embodiment, the flat surface of the shank portion may be parallel to the axis.

As a preferred embodiment of the first invention, the first flat surface is provided at a position of a predetermined angle in a range of 60 to 120 degrees, both inclusive, about an axis of the shank portion with respect to the second flat surface. According to this embodiment, the pressing force is applied to the first flat surface in a direction crossing the direction in which the pressing force is applied to the second flat surface. Thus, the shank portion is pressed in a preferable manner against the inner peripheral surface of the tool holder, and chucking is improved. In a more preferred embodiment, the first flat surface is provided at a position of a predetermined angle in a range of 80 to 100 degrees, both inclusive, about the axis of the shank portion with respect to the second flat surface. In a more preferred embodiment, the first flat surface is provided at a position of 90 degrees about the axis of the shank portion with respect to the second flat surface.

If the angle between the first flat surface and the second flat surface is less than 60 degrees, the force that presses the shank portion in the specific radial direction is increased. If the angle between the first flat surface and the second flat surface is more than 120 degrees, the rate at which the total force of the force that is applied from the side lock bolt to the first flat surface and the force that is applied from the side lock bolt to the second flat surface is cancelled is increased, and the force that presses the shank portion in the radial direction toward the tool holder is reduced.

In a preferred embodiment, at least one of the first and second flat surfaces is surface-treated so as to have a higher friction coefficient. According to this embodiment, the side lock bolt is less likely to slide on the surface-treated flat surface when the surface-treated flat surface abuts on the side lock bolt. Thus, the side lock bolt can reliably press the flat surface. This makes it more difficult for the shank portion to come off from the tool holder. Examples of this surface treatment include a shot peening process and a plating process. Alternatively, other physical or chemical treatment may be performed.

In an embodiment of the first invention, the shank structure of the end mill further includes a fluid passage extending from the shank portion toward a tip end of the end mill. According to this embodiment, liquid such as cutting fluid or cleaning fluid can be supplied from the tool holder to the end mill, and the liquid can be directly injected from a cutting edge of the end mill onto a workpiece. In another embodiment, the liquid may be injected from the tool holder toward the cutting edge without flowing through the end mill.

A tool holder according to a second invention includes: a cylindrical tool attaching/detaching portion having in its center a tool holding hole extending from an axial tip end toward an axial rear end; and first and second side lock bolts that are respectively screwed in first and second through holes formed at different circumferential positions so as to extend from an outer peripheral surface of the tool attaching/detaching portion to an inner peripheral surface thereof, wherein a shank portion of an end mill is chucked by fastening and rotating the first and second side lock bolts so that flat tip end faces formed at tip ends of the first and second side lock bolts abut on the shank portion of the end mill. According to the second invention, the flat tip end faces at the tip ends of the first and second side lock bolts face the first and second flat surfaces formed in the shank portion, and the shank structure of the first invention can be chucked in a preferable manner. The second invention does not exclude formation of an additional side lock bolt at a different circumferential position in addition to the first and second side lock bolts.

In a preferred embodiment, the tool attaching/detaching portion further has a centering holding unit that is provided in the axial tip end of the tool attaching/detaching portion to center and hold the shank portion of the end mill, and the first and second side lock bolts chuck the shank portion of the end mill with the shank portion of the end mill being centered and held by the centering holding unit.

According to this embodiment, since the shank portion of the end mill is centered, the tip end of the tool attaching/detaching portion can hold the shank portion of the end mill uniformly in the circumferential direction. Thus, the axis of the tool holder is aligned with the axis of the end mill, and the end mill can be held with high accuracy. Then, the plurality of side lock bolts perform a function to provide final fastening, and thus prevent rotation of the shank portion of the end mill. Since the centering holding unit and the plurality of side lock bolts are provided, chucking is not loosened even if a cutting process is performed for a long time.

The centering holding unit is not specifically limited. In an embodiment, the centering holding unit includes a taper that is formed in the outer peripheral surface of the tool attaching/detaching portion so as to be tapered toward the axial tip end, a cylindrical fastening member that has an inner peripheral surface tapered at a same angle as the outer peripheral surface of the tool attaching/detaching portion and surrounds the outer peripheral surface of the tool attaching/detaching portion which is located closer to the axial tip end than the side lock bolts, a plurality of needle rollers that are placed in an annular space between the inner peripheral surface of the fastening member and the outer peripheral surface of the tool attaching/detaching portion, and a retainer that holds the needle rollers so that the needle rollers are tilted at a predetermined angle in a circumferential direction with respect to an axis of the tool attaching/detaching portion, and the fastening member is rotated so that the needle rollers revolve in a helical pattern while rotating, whereby the tool holding hole is reduced in diameter or is restored.

In this embodiment, the fastening member is rotated in a fastening direction, and the tool holding hole is reduced in diameter along a predetermined axial dimension of the tool holding hole due to the tapering action. Thus, the axis of the tool holder is aligned with the axis of the end mill, and the shank portion can be fastened and held with a force that is uniform along the entire circumference of the shank portion. Accordingly, the centering holding unit can be implemented in a preferable manner. In another embodiment, the centering holding unit may be a taper collet chuck for centering, a shrink-fit chuck for centering, a hydro chuck for centering, or CoroGrip (registered trademark) for centering.

In an embodiment, the side lock bolt includes a bolt body that is screwed in the through hole, and a pressing member having a pressing surface that abuts on the shank portion of the end mill, and being attached to a tip end of the bolt body so that orientation of the pressing surface can be changed as desired. In this embodiment, even if the flat surface of the shank portion does not extend in a direction that crosses a direction in which the side lock bolt advances, the pressing surface at the tip end of the side lock bolt changes its orientation according to the flat surface of the shank portion and surface contacts the flat surface when the side lock bolt is rotated in the fastening direction. Accordingly, the side lock bolt firmly presses the flat surface of the shank portion, and the shank portion can be more reliably chucked.

In a preferred embodiment, the flat tip end face of the side lock bolt may be surface-treated so as to have a higher friction coefficient. In this embodiment, the surface-treated tip end face of the side lock bolt is less likely to slide on the flat surface of the shank portion when the surface-treated tip end abuts on the flat surface of the shank portion. Thus, the side lock bolt can reliably press the flat surface. This makes it more difficult for the shank portion to come off from the tool holder. Examples of this surface treatment include a shot peening process and a plating process. Alternatively, other physical or chemical treatment may be performed. The side lock bolt that is surface-treated so as to have a higher friction coefficient is at least one of the first and second side lock bolts. The flat surface of the shank portion which abuts on the tip end face of this side lock bolt is at least one of the first and second flat surfaces.

In a further preferred embodiment, the tool holder may comprise a stopper member provided on a bottom side of the tool holding hole and adapted to define an axial position of the shank portion of the end mill inserted in the tool holding hole.

In a much further preferred embodiment, the stopper member may have a communication passage extending through the stopper member in the axial direction, and an opening at the tip end of the communication passage is configured to connect to an opening at the rear end of a fluid passage of the shank portion of the end mill.

Thus, in the shank structure of the present invention, the shank portion of the end mill is not subjected to the specific radial force, and improved chucking is provided.

DESCRIPTION OF EMBODIMENTS

Figure 1:
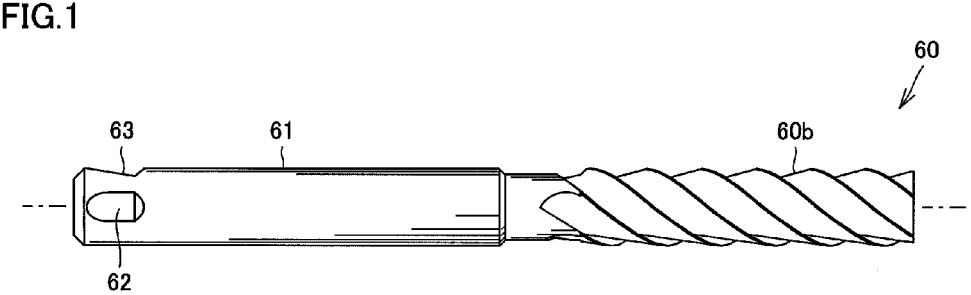
FIG. 1 is a side view showing an end mill according to an embodiment of the present invention.
Figure 2:
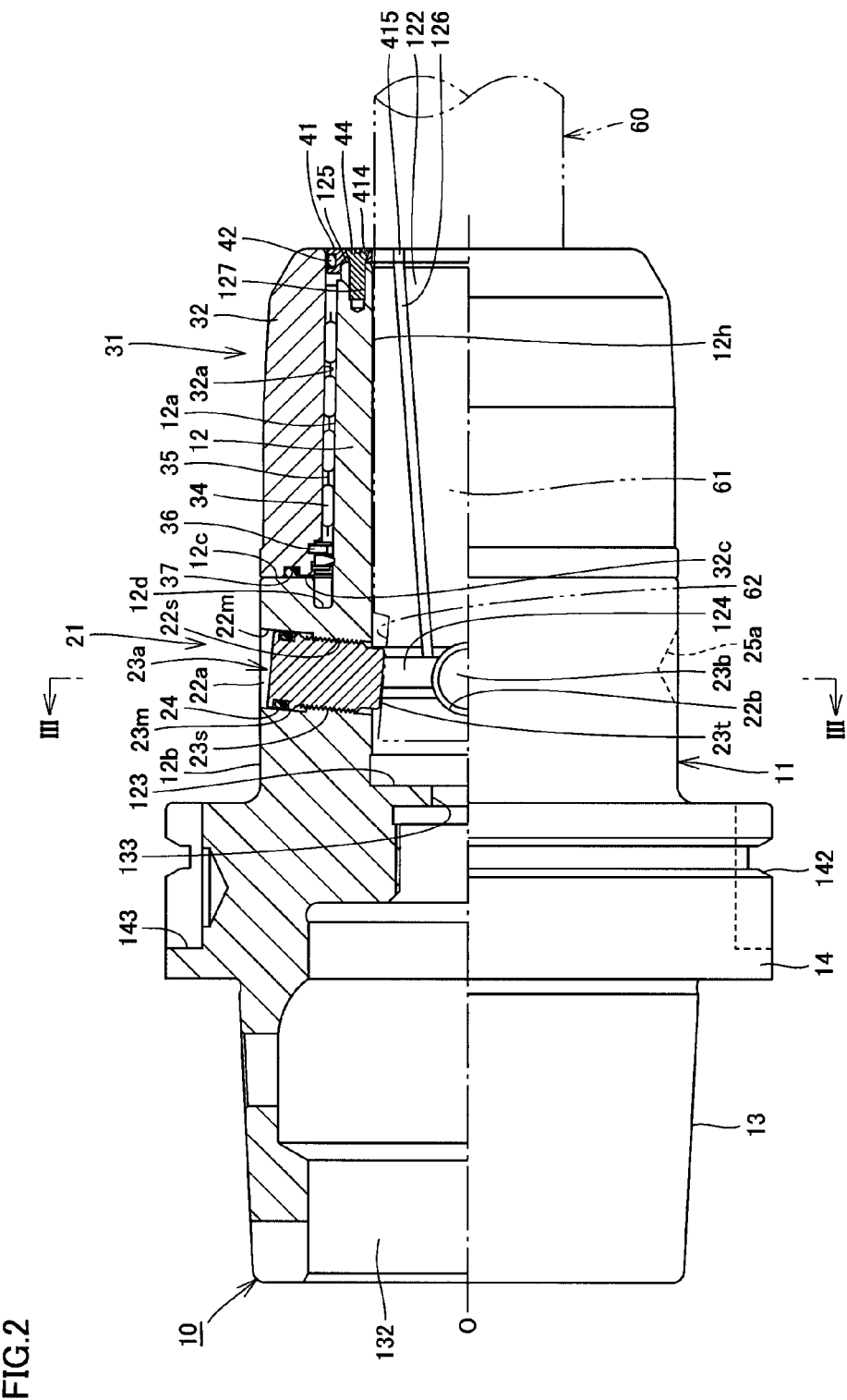
FIG. 2 is an overall view showing an end mill and a tool holder according to an embodiment of the present invention.
Figure 3:
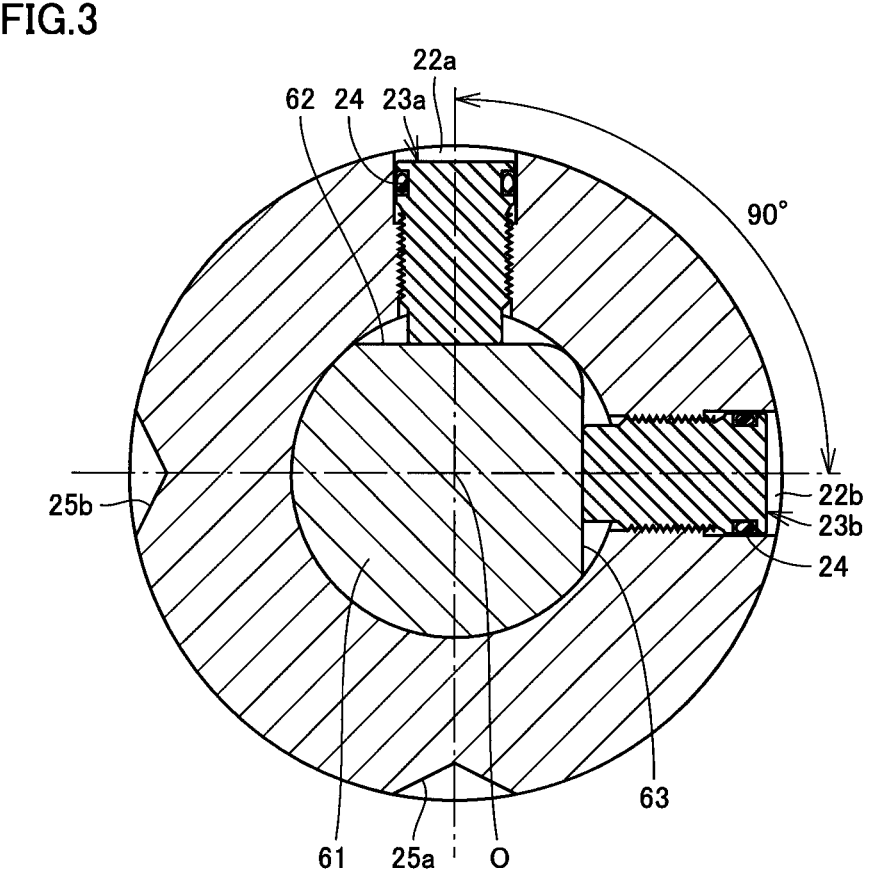
FIG. 3 is a transverse sectional view taken along line II-II in FIG. 2.
Figure 4:
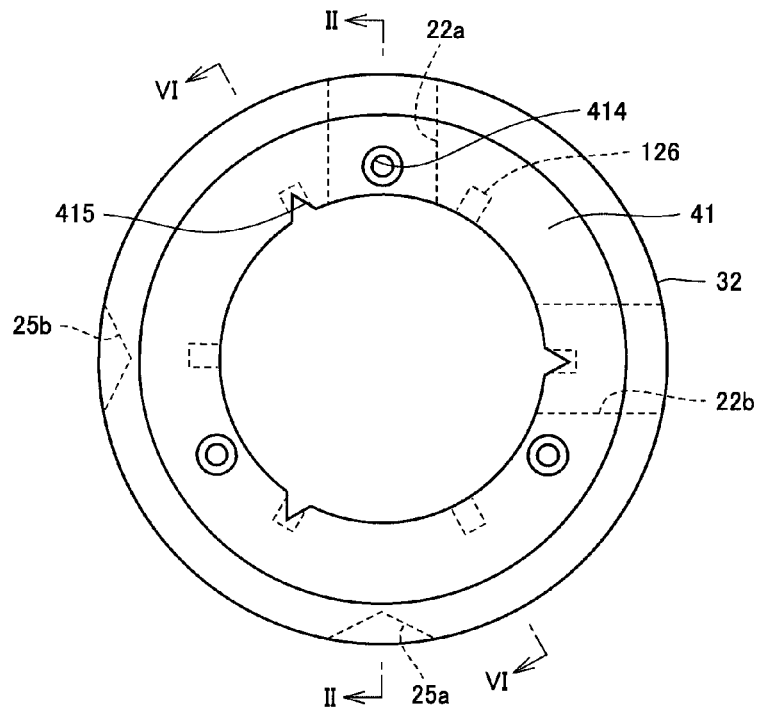
FIG. 4 is a front view showing an axial tip end of a tool holder.
Figure 5:
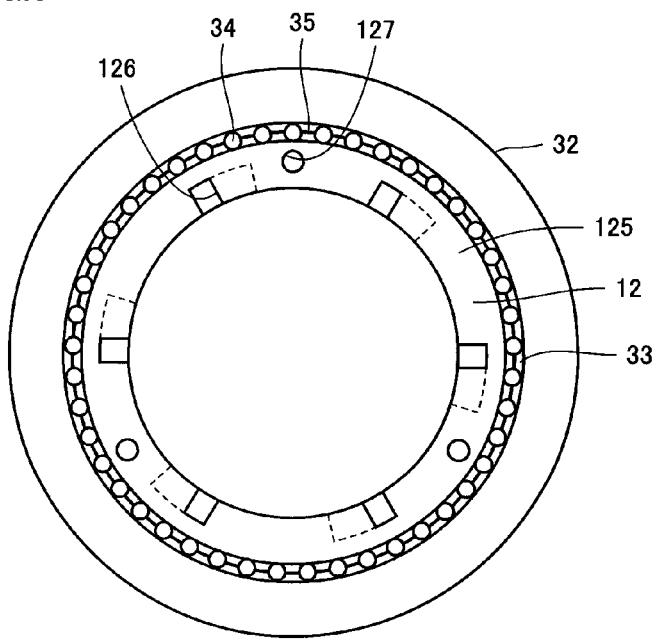
FIG. 5 is a front view showing an axial tip end of a tool holder having a lid member removed therefrom.
Figure 6:
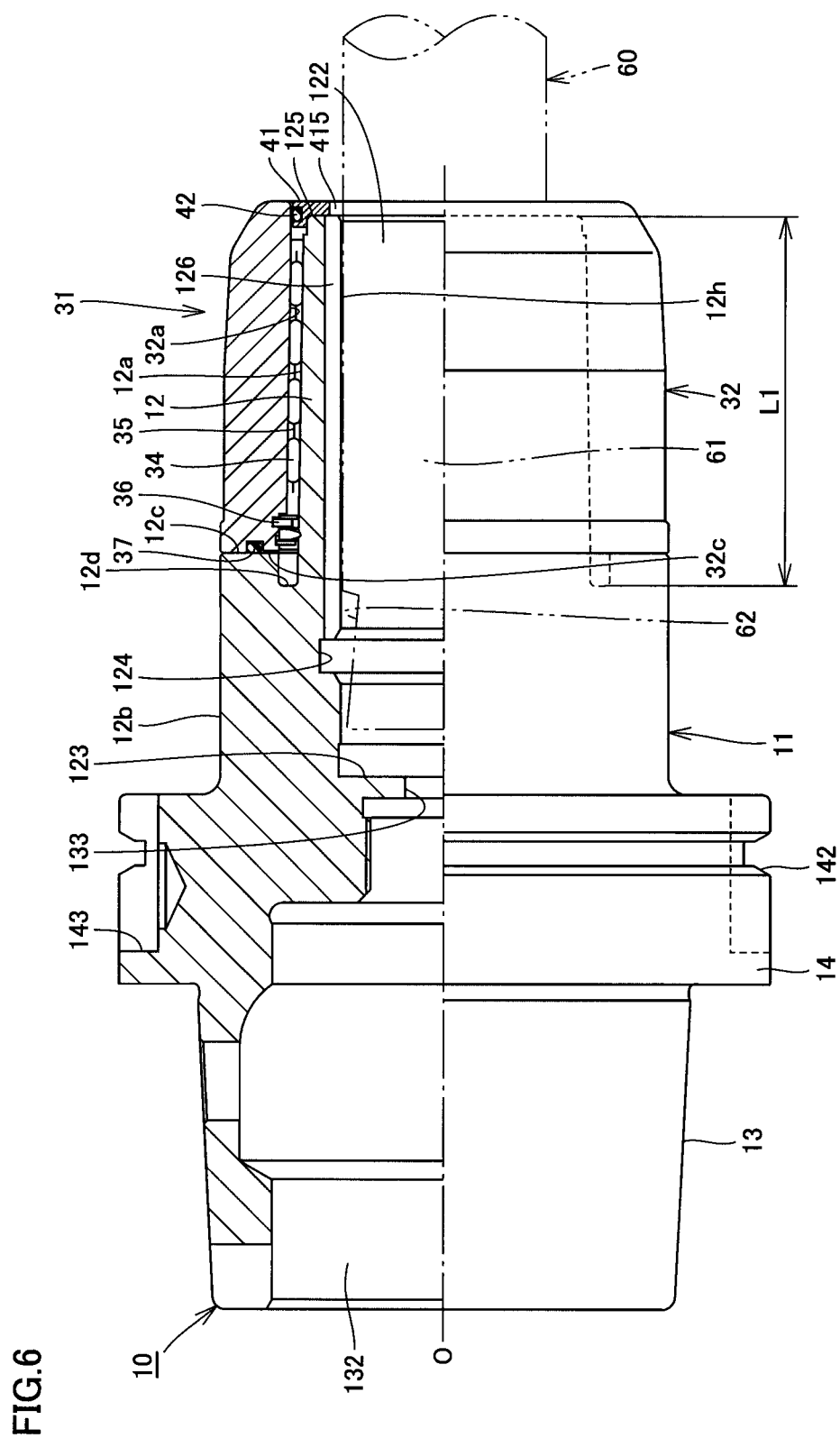
FIG. 6 is an overall view showing a groove formed in an inner peripheral surface of a tool attaching/detaching portion of a tool holder.
Figure 7:
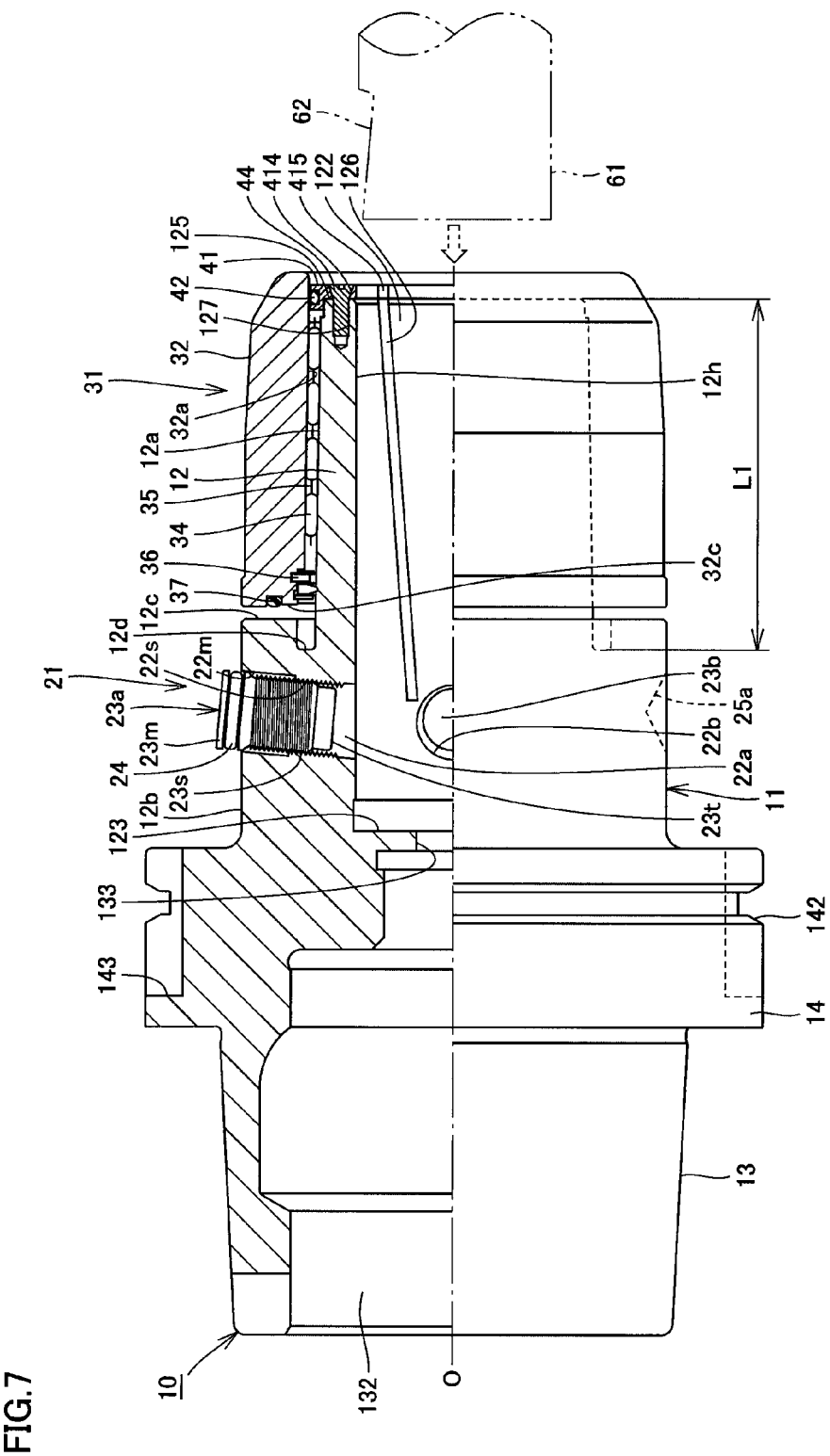
FIG. 7 is an overall view showing a tool holder before chucking, which is not holding a shank portion of an end mill.

Embodiments of the present invention will be described in detail below with reference to the accompanying drawings. FIG. 1 is a side view showing an end mill according to an embodiment of the present invention. FIG. 2 is an overall view showing a tool holder according to an embodiment of the present invention. FIG. 3 is a transverse sectional view showing the tool holder and the end mill of the embodiment taken along line III-III in FIG. 2, as viewed from the direction shown by an arrow. FIG. 4 is a front view showing an axial tip end of the tool holder of the embodiment. FIG. 5 is a front view showing the axial tip end of the tool holder of the embodiment having a lid member removed therefrom. FIG. 6 is an overall view showing a groove formed in an inner peripheral surface of a tool attaching/detaching portion of the tool holder of the embodiment. FIG. 7 is an overall view showing the tool holder of the embodiment before chucking, which is not holding a shank portion of the end mill. In FIGS. 2, 6, and 7, the upper half of the tool holder is shown by a longitudinal sectional view, and the lower half of the tool holder is shown by a side view. The cross section in FIG. 2 and the cross section in FIG. 6 are taken along chain lines II-II and VI-VI in FIG. 4, respectively.

An end mill 60 is made of steel, and has a cutting portion 60b in an axial tip end region (as used herein, the term "axial" refers to the direction of an axis O"), and has a shank portion 61 in an axial rear end region. The cutting portion 60b is made of a super steel alloy. The shank portion 61 is basically a cylindrical portion having a circular cross section with a constant radius, but has two flat surfaces (hereinafter referred to as the "first flat surface 62" and the "second flat surface 63") formed in its outer periphery by a cutting process.

As shown in FIG. 1, the first flat surface 62 and the second flat surface 63 are provided in the axial rear end of the shank portion 61. As shown in FIG. 2, the first flat surface 62 is not parallel to the axis O of the shank portion 61, but is slightly tilted so as to face toward the tip end of the end mill 60. The tilt angle of the first flat surface 62 is 5 degrees with respect to the axis O. Alternatively, the first flat surface 62 is a surface tilted at an angle in the range of 1 to 10 degrees. The second flat surface 63 is formed in a manner similar to that of the first flat surface 62.

As shown in FIG. 3, the first flat surface 62 is provided at a position of 90 degrees about the axis O of the shank portion 61 with respect to the second flat surface 63. Alternatively, the first flat surface 62 is provided at a position of 80 to 100 degrees about the axis O of the shank portion 61 with respect to the second flat surface 63. "90 degrees" shown in FIG. 3 is an angle from the center in the circumferential direction of the first flat surface 62 to the center in the circumferential direction of the second flat surface 63.

A tool holder 10 includes as main components a holder body 11, first and second side lock bolts 23a, 23b, and a fastening member 32.

The holder body 11 is made of a metal, and extends along the axis O shown by chain line. The holder body 11 has in an axial tip end region a tool attaching/detaching portion 12 that chucks the end mill 60, and has in an axial rear end region a mount portion 13 that is mounted on a main shaft of a machine tool. A flange portion 14 having a large diameter is formed in a central portion in the direction of the axis O of the holder body 11 so as to protrude radially outward beyond the tool attaching/detaching portion 12 and the mount portion 13. A V-shaped groove 142 extending in the circumferential direction is formed in an outer peripheral edge of the flange portion 14. A drive key groove 143 extending in the axial direction is also formed in the outer peripheral edge of the flange portion 14.

The mount portion 13 is shaped so as to fit on the main shaft of the machine tool, not shown. The outer peripheral surface of the mount portion 13 of the present embodiment is tapered so that the radius of the outer peripheral surface of the mount portion 13 decreases toward the rear end in the axial direction of the mount portion 13. The mount portion 13 has a central hole 132 extending along the axis O as the center of the holder body 11. The central hole 132 extends from the axial rear end of the holder body 11 toward the axial tip end thereof, and has several different inner diameters at intermediate positions in the axial direction. The innermost part of the central hole 132, which is located closest to the axial tip end of the holder body 11, is a small central hole 133 having a small diameter. A main shaft-side member, not shown, fits in the axial rear end of the central hole 132. The mount portion 13 is pulled rearward by the main shaft-side member, whereby the mount portion 13 is firmly mounted on a center through coolant main shaft of the machine tool. Then, cutting fluid or cleaning fluid flows into the central hole 132 from the center through coolant main shaft. Thus, the central hole 132 serves as a fluid passage.

The tool attaching/detaching portion 12 has a cylindrical shape having an opening in its axial tip end, and has an outer peripheral surface and an inner peripheral surface 12h. The inner peripheral surface 12h defines and forms a tool holding hole 122 extending along the axis O from the axial tip end of the tool attaching/detaching portion 12 toward the axial rear end thereof. The tool holding hole 122 has a constant inner diameter, and has a bottom 123. The tool holding hole 122 connects to the small central hole 133 formed in the bottom 123. This allows the cutting fluid to flow from the central hole 123 onto the bottom 123 of the tool holding hole 122.

As shown in FIG. 2, a circumferential groove 124 is formed in the inner peripheral surface 12h of the tool attaching/detaching portion 12. As shown in FIG. 6, grooves 126 are formed in the inner peripheral surface 12h of the tool attaching/detaching portion 12. The grooves 126 extend from an axial tip end face 125 of the tool attaching/detaching portion 12 toward the axial rear end thereof, and connect to the peripheral groove 124. The cutting fluid, which has flown from the small central hole 133 onto the bottom of the tool holding hole 122, flows along the grooves 126 through the circumferential groove 124, and flows toward the axial tip end face 125. As a modification, the circumferential groove 124 may not be formed in the inner peripheral surface 12h.

To be exact, the grooves 126 do not extend parallel to the axis O, but are tilted in the circumferential direction as shown by solid line in FIG. 2 and broken line FIG. 5. For convenience, the entire length of one groove 126 is shown in FIG. 6, and the other grooves 126 are not shown in FIG. 6.

The axial tip end face 125 is covered by a lid member 41. As shown in FIG. 4, the lid member 41 is a ring-shaped plate material, and has end faces on both sides in the direction of the axis O of the tool holder 10. The outer peripheral edge of the lid member 41 protrudes radially outward beyond the axial tip end face 125. A plurality of through holes 414 are formed in the lid member 41 at predetermined intervals in the circumferential direction. Bolts 44 are inserted through the through holes 414 from the side of the axial tip end, and the tip ends of the bolts 44 are screwed in bolt holes 127 (FIGS. 2 and 5) formed in the axial tip end face 125, whereby the lid member 41 is attached and fixed to the axial tip end of the tool attaching/detaching portion 12.

As shown in FIG. 4, injection ports 415 in the shape of a triangular groove are formed in the inner peripheral edge of the lid member 41 so as to extend from the tip end face of the lid member 41 to the rear end face thereof. When the lid member 41 is fixed to the axial tip end of the tool attaching/detaching portion 12, the injection ports 415 are aligned with the axial tip ends of the grooves 126, as shown in FIG. 6. When the shank portion 61 of the end mill 60 is inserted in the tool holding hole 122 so that the shank portion 61 having a circular cross section is chucked by the tool attaching/detaching portion 12, the grooves 126 and the injection ports 415 form continuous fluid passages. The cutting fluid flowing along the grooves 126 is injected from the injection ports 415 toward the tip end of the end mill 60, and reaches a workpiece (an object to be cut), not shown. Thus, the grooves 126 functions as cutting fluid passages. The grooves 126 also facilitate elastic deformation of the tool attaching/detaching portion 12 in the direction in which the diameter of the tool attaching/detaching portion 12 is reduced. The number of grooves 126 is preferably larger than one, and may be larger than that of grooves 126 in the embodiment shown in FIG. 5.

The tool holder 10 has a side lock chucking structure 21 and a roll lock chucking structure 31 in the tool attaching/detaching portion 12 as a structure that chucks the shank portion 61 of the end mill 60. The roll lock chucking structure 31 corresponds to a centering holding unit that centers and holds the shank portion 61 of the end mill 60. The side lock chucking structure 21 has a function to provide final fastening, namely a function to chuck the shank portion 61 of the end mill 60 which has been centered and held.

The side lock chucking structure 21 will first be described. An outer peripheral surface 12a of a tip end portion of the tool attaching/detaching portion 12 has a small diameter, and an outer peripheral surface 12b of a rear end portion of the tool attaching/detaching portion 12 has a large diameter. An annular stepped surface 12c is formed between the tip end outer peripheral surface 12a and the rear end outer peripheral surface 12b. Two through holes 22a, 22b are formed in the rear part of the tool attaching/detaching portion 12. The first through hole 22a extends from the rear end outer peripheral surface 12b of the tool attaching/detaching portion 12 to the inner peripheral surface 12h of the tool attaching/detaching portion 12, and connects to the tool holding hole 122. The first through hole 22a extends substantially in the radial direction of the tool attaching/detaching portion 12, but as shown in FIG. 2, is slightly tilted so that the outer-diameter side of the first through hole 22a is located closer to the axial tip end of the tool attaching/detaching portion 12 than the inner-diameter side of the first through hole 22a. The tilt angle of the first through hole 22a is 5 degrees with respect to the direction at right angles to the axis O of the holder member 11. Alternatively, the tilt angle of the first through hole 22a is in the range of 1 to 10 degrees so as to correspond to the tilt angle of the first flat surface 62.

The second through hole 22b is provided in a manner similar to that of the first through hole 22a. The second through hole 22b extends substantially in the radial direction of the tool attaching/detaching portion 12, but is slightly tilted so that the outer-diameter side of the second through hole 22b is located closer to the axial tip end of the tool attaching/detaching portion 12 than the inner-diameter side of the second through hole 22b. The tilt angle of the second through hole 22b is 5 degrees with respect to the direction at right angles to the axis O of the holder member 11. Alternatively, the tilt angle of the second through hole 22b is in the range of 1 to 10 degrees so as to correspond to the tilt angle of the second flat surface 63. The through holes 22a, 22b are placed at the same axial position, and the circumferential groove 124 is formed at the axial position of the through holes 22a, 22b.

The through hole 22a is provided at a position of 90 degrees about the axis O of the holder body 11 with respect to the through hole 22b. Alternatively, the angle from the through hole 22a to the through hole 22b is in the range of 80 to 100 degrees so as to correspond to the angle from the first flat surface 62 to the first flat surface 63.

The first through hole 22a has an internally threaded portion 22s near the tool holding hole 122. An outer-diameter portion 22m of the first through hole 22a, which is located far from the tool holding portion 122, has a larger inner diameter than the internally threaded portion 22s. The first side lock bolt 23a is screwed into the first through hole 22a from the outer-diameter side. The second through hole 22b is configured in a manner similar to that of the first through hole 22a, and the second side lock bolt 23b is screwed into the second through hole 22b from the outer-diameter side.

The first side lock bolt 23a has a head portion 23m in its longitudinal rear end, and has an externally threaded portion 23s in its longitudinal central region. The longitudinal tip end of the side lock bolt 23a has a smaller diameter than the externally threaded portion 23s, and the side lock bolt 23a has a tip end face 23t that is a flat surface perpendicular to the longitudinal direction of the side lock bolt 23a. The head portion 23m is accommodated in the outer-diameter portion 22m, and the externally threaded portion 23s is screwed in the internally threaded portion 22s. The tip end of the side lock bolt 23a protrudes from the through hole 22a into the tool holding hole 122.

An annular groove is formed in the outer periphery of the head portion 23m of the side lock bolt 23a, and an O-ring 24 as an annular sealing member engages with the annular groove. The O-ring 24 contacts the outer-diameter portion 22m of the through hole 22a along the entire circumference. Thus, the O-ring 24 seals the annular gap between the through hole 22a and the side lock bolt 23a.

The second side lock bolt 23b is configured in a manner similar to that of the first side lock bolt 23a.

A recess 25a is provided in the rear end outer peripheral surface 12b of the tool attaching/detaching portion 12 at a different circumferential position from the through hole 22a. The recess 25a serves to prevent the center of gravity of the holder body 11 from being shifted from the axis O due to the formation of the through hole 22a. As shown in FIG. 3 as a simple embodiment, the recess 25a is formed at a position of 180° in the circumferential direction with respect to the through hole 22a. Thus, the center of gravity of the holder body 11 is aligned with the axis O, and the mass about the axis O can be balanced. Similarly, a recess 25b is provided in the rear end outer peripheral surface 12b of the tool attaching/detaching portion 12 at a different circumferential position from the through hole 22b. As another embodiment, a recess or a mass adjusting portion made of a mass body is formed at a position of an angle other than 180° in the circumferential direction with respect to the through hole 22a, 22b.

The recesses 25a, 25b may be provided to balance the mass of the holder body 11 and the side lock bolts 23a, 23b about the axis in the state where the shank portion 61 of the end mill 60 inserted in the tool holding hole 122 is fixed by the side lock bolts 23a, 23b. Thus, the center of gravity of an assembly of the side lock bolts 23a, 23b rotated in the fastening direction until the shank portion 61 of the end mill 60 is fixed and the holder body 11 having the through holes 22a, 22b can be approximately aligned with the axis O or can be aligned with the axis O. This can prevent displacement of the axis of the cutting portion 60b provided at the tip end of the end mill 60, and the workpiece can be processed with high accuracy.

The roll lock chucking structure 31 will be described below. The tip end outer peripheral surface 12a of the tool attaching/detaching portion 12 has a circular cross section about the axis O, is tapered so that the diameter of the tip end outer peripheral surface 12a decreases toward the axial tip end (e.g., 1/32 taper), and is surrounded by the fastening member 32.

The fastening member 32 reduces the diameter of the tool attaching/detaching portion 12 and tightly holds the shank portion 61 of the end mill 60 so that the entire outer periphery of the shank portion 61 of the end mill 60 closely contacts the inner peripheral surface 12h along its entire circumference. An inner peripheral surface 32a of the fastening member 32 is tapered at the same angle as the tip end outer peripheral surface 12a (e.g., 1/32 taper), and faces the tip end outer peripheral surface 12a. A retaining ring 36 is attached to the inner peripheral surface of a rear end portion of the fastening member 32. If the fastening member 32 moves toward the axial tip end, the inner peripheral edge of the retaining ring 36 abuts on an engagement portion formed in the tip end outer peripheral surface 12a, thereby restricting further movement of the fastening member 32 toward the axial tip end. This prevents the fastening member 32 from coming off from the tool attaching/detaching portion 12.

A plurality of needle rollers 34 and a retainer 35 that aligns the needle rollers 34 are placed in an annular space 33 formed between the inner peripheral surface 32a of the fastening member 32 and the tip end outer peripheral surface 12a of the tool attaching/detaching portion 12. The retainer 35 is formed in the form of a cylinder body tapered at the same angle as the tip end outer peripheral surface 12a, and is loosely fitted on the tip end outer peripheral surface 12a.

The thickness dimension of the retainer 35 is smaller than the interval between the inner peripheral surface 32a and the tip end outer peripheral surface 12a, i.e., the diameter of the needle rollers 34. A plurality of pockets, each holding one or more of the needle rollers 34, are formed in the retainer 35 at predetermined intervals in the circumferential direction and at predetermined intervals in the axial direction. The pockets are rectangular holes that extend through the retainer 35 in the radial direction. Rolling surfaces of the needle rollers 34 protrude from the pockets radially inward of the retainer 35, and contact the tip end outer peripheral surface 12a. The rolling surfaces of the needle rollers 34 also protrude from the pockets radially outward of the retainer 35, and contact the inner peripheral surface 32a.

The pockets of the retainer 35 are tilted at a predetermined angle in the circumferential direction with respect to the central axis. Thus, the needle rollers 34 held by the pockets are tilted at the predetermined angle in the circumferential direction with respect to the axis O, and roll on the tip end outer peripheral surface 12a so as to make a helical track.

The fastening member 32 is made of a metal, and the axial tip edge of the fastening member 32 protrudes beyond the axial tip end face 125 of the tool attaching/detaching portion 12 toward the axial tip end. The axial tip edge of the fastening member 32 faces the outer peripheral edge of the lid member 41. The outer-diameter dimension of the lid member 41 is larger than that of the axial tip end face 125, and the lid member 41 covers an opening at the axial tip end of the annular space 33 between the fastening member 32 and the tool attaching/detaching portion 12. Thus, the outer peripheral edge of the lid member 41 restricts movement of the retainer 35 toward the axial tip end, and the retainer 35 does not come off from the tool attaching/detaching portion 12.

An O-ring 42 as an annular outer-peripheral sealing member is attached to the outer peripheral edge of the lid member 41. The O-ring 42 seals between the lid member 41 and the fastening member 32. This prevents foreign matter from entering the annular space 33.

The axial rear edge of the fastening member 32 is formed in an annular flat surface 32c perpendicular to the axis O, and faces the annular stepped surface 12c of the holder body 11. The fastening member 32 is movable in the axial direction in a region located on the tip end side of the annular stepped surface 12c. The annular stepped surface 12c restricts rearward movement in the axial direction of the fastening member 32 so as not to allow the fastening member 32 to move toward the rear end beyond the annular stepped surface 12c. An annular groove is formed in the annular flat surface 32c, and an O-ring 37 as an annular sealing member is attached to the annular groove.

An annular groove 12d about the axis O is formed on an inner-diameter portion of the annular stepped surface 12c. A side surface on the inner-diameter side of the annular groove 12d has the same diameter as the tip end outer peripheral surface 12a, and is continuous with the tip end outer peripheral surface 12a, thereby increasing the axial dimension of the tip end outer peripheral surface 12a. Thus, an effective holding length L1 of the roll lock chucking structure 31 can be increased without increasing the length of the holder body 11.

In the operation of chucking the end mill 60, the shank portion 61 of the end mill 60 is first inserted into the tool holding hole 122, the shank portion 61 is then held with high accuracy by the roll lock chucking structure 31, and thereafter rotation of the shank portion 61 is prevented by the side lock chucking structure 21. According to the present embodiment, in a former part of the operation, the fastening member 32 is rotated to reduce the diameter of the tool holding hole 122, and the shank portion 61 of the end mill 60 is held by the fastening member 32, whereby the axis of the end mill 60 is aligned with the axis of the holder body 11, and the shank portion 61 of the end mill 60 can be held with high accuracy by the tool attaching/detaching portion 12. In a later part of the operation, the two side lock bolts 23a, 23b are fastened, whereby the shank portion 61 of the end mill 60, which has been held with high accuracy so as to be aligned with the axis O, can be prevented from rotating without being displaced from the axis O. If the former and later parts of the operation are performed in reverse order, the shank portion of the end mill cannot be held with high accuracy.

Figure 10:
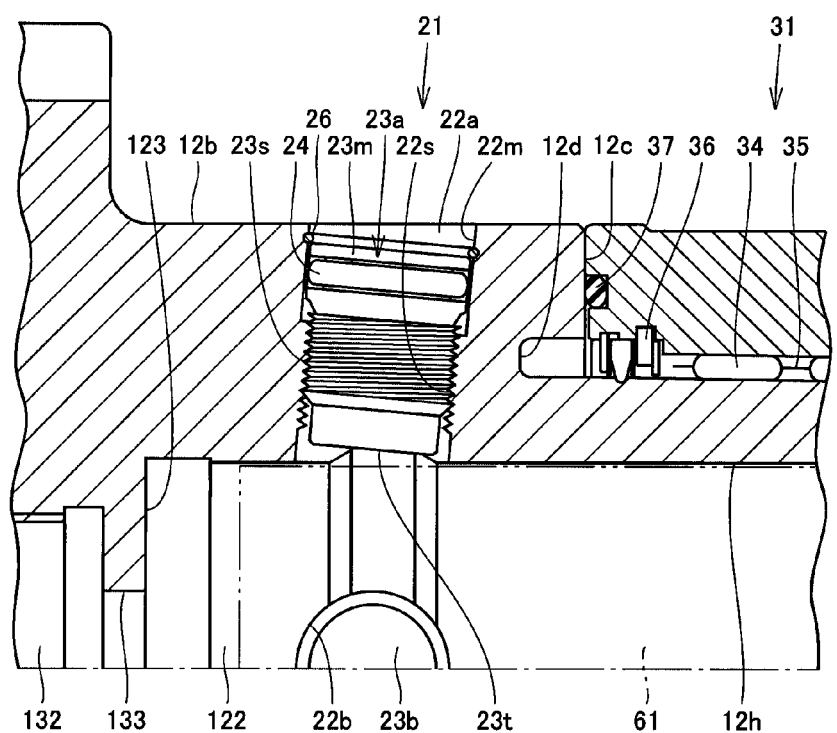
FIG. 10 is a longitudinal sectional view showing a side lock chucking structure according to a modification of the present invention.

The chucking operation will be described in detail below. As shown in FIG. 10, the side lock bolts 23a, 23b are rotated in advance in the loosening direction so that the tip ends of the side lock bolts 23a, 23b are withdrawn from the tool holding hole 122. The fastening member 32 is rotated in the loosening direction to restore the tool attaching/detaching portion 12 radially outward, thereby increasing the inner-diameter dimension of the tool holding hole 122. Next, the shank portion 61 of the end mill 60 is inserted into the tool holding hole 122 from the side of the axial tip end. Since a part of the outer periphery of the shank portion 61 has been cut to form the first and second flat surfaces 62, 63 having a phase difference of about 90 degrees from each other. Thus, the end mill 60 is pivoted so that the first flat surface 62 faces the through hole 22a. At this time, the second flat surface 63 also faces the through hole 22b.

Then, the fastening member 32 is rotated in the fastening direction, and the needle rollers 34, which are in contact with the inner peripheral surface 32a of the fastening member 32, revolve in a helical pattern on the tip end outer peripheral surface 12a while rotating. Thus, the fastening member 32 together with the retainer 35 gradually moves toward the axial rear end. Accordingly, due to the wedging action of the tapered inner peripheral surface 32a and the tapered outer peripheral surface 12a, the outer peripheral surface 12a is strongly pressed radially inward along its entire circumference and is reduced in diameter. As a result, the tool holding hole 122 formed in the center of the tool attaching/detaching portion 12 is also reduced in diameter, and a cylindrical portion as the front part of the shank portion 61 inserted in the tool holding hole 122 is fastened uniformly along its entire circumference by the inner peripheral surface 12h in the effective holding length L1 of the tip end outer peripheral surface 12a. Accordingly, the tool attaching/detaching portion 12 holds the outer peripheral surface of the shank portion 61 uniformly in the circumferential direction. Thus, the shank portion 61 is tightly and firmly held by an axial region of the tool attaching/detaching portion 12, and the axis of the holder body 11 is aligned with the axis of the end mill 60, whereby the end mill 60 is held with high accuracy along the axis O.

When the fastening member 32 is rotated in the fastening direction to hold the shank portion 61, the annular flat surface 32c at the axial rear end of the fastening member 32 abuts on the annular stepped surface 12c of the holder body 11, and the O-ring 37 is interposed between the axial rear edge of the fastening member 32 and the annular stepped surface 12c of the holder body 11. Thus, the opening in the axial rear end of the annular space 33 between the fastening member 32 and the tool attaching/detaching portion 12 can be sealed, whereby foreign matter is prevented from entering the annular space 33.

Thereafter, both of the side lock bolts 23a, 23b are rotated in the fastening direction so that the tip end face 23t of the side lock bolt 23a screwed into the through hole 22a abuts on the first flat surface 62 and that the tip end face 23t of the side lock bolt 23b screwed into the through hole 22b abuts on the second flat surface 63. The flat tip end face 23t of the side lock bolt 23a presses with a strong force the first flat surface 62 in the rear part of the shank portion 61, and the flat tip end face 23t of the side lock bolt 23b presses with a strong force the second flat surface 63 in the rear part of the shank portion 61, thereby fixing the shank portion 61 in the tool holding hole 122. Since the circumferential groove 124 is formed at the same axial position as the through holes 22a, 22b, the cutting fluid flowing from the central hole 132 toward the axial tip end flows into the circumferential groove 124 on the side of the axial rear end with respect to the cylindrical portion in the front part of the shank portion 61. Thus, the cutting fluid smoothly flows into the grooves 126.

As described above, the shank portion 61 is first held by using the roll lock chucking structure 31, and then rotation of the shank portion 61 is prevented by using the side lock chucking structure 21, whereby the shank portion 61 is chucked by the tool attaching/detaching portion 12 as shown in FIGS. 2 and 3. The operation described above is performed in reverse order in order to remove the end mill 60.

Figure 8:
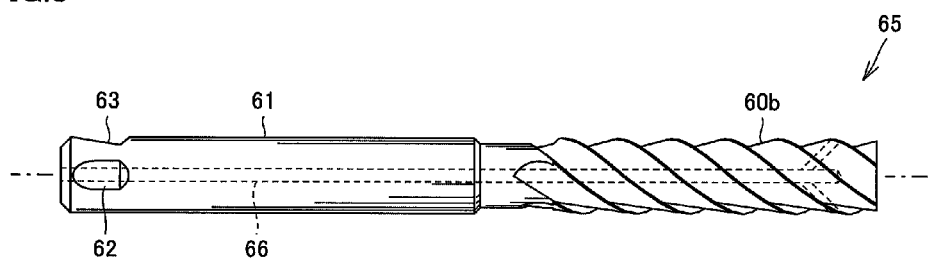
FIG. 8 is a side view showing an end mill according to another embodiment of the present invention.
Figure 9:
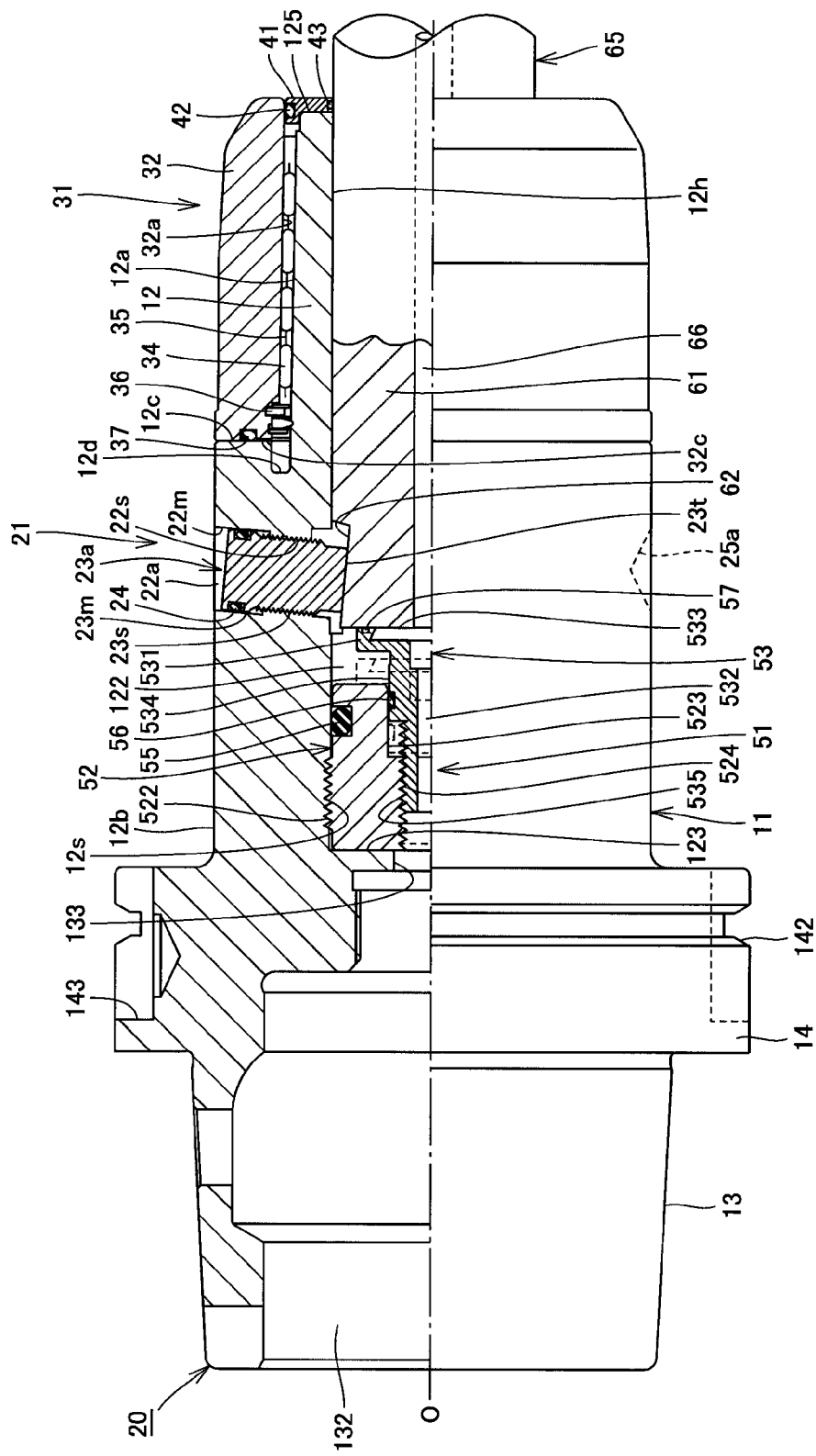
FIG. 9 is an overall view showing a tool holder according to another embodiment of the present invention.

Another embodiment of the present invention will be described below. FIG. 8 is a side view showing an end mill according to another embodiment of the present invention. FIG. 9 is a longitudinal sectional view showing a tool holder that chucks the end mill of FIG. 8. In this embodiment, the same configurations as those of the above embodiment are denoted with the same reference characters, and description thereof is omitted. Configurations different from the above embodiment will be described below.

An end mill 65 according to this embodiment has the same basic configuration as the end mill 60, and further includes a fluid passage 66 extending from the shank portion 61 toward the tip end of the end mill 65.

A tool holder 20 of this embodiment has the two side lock bolts 23a, 23b described above, and further has an O-ring 43 as an annular inner peripheral sealing member that seals between the inner peripheral edge of the lid member 41 and the outer peripheral surface of the shank portion 61 of the end mill 65 inserted in the tool holding hole 122. The fluid passage 66 extending from the rear end of the end mill 65 toward the tip end thereof is formed in the shank portion 61 that is chucked by the tool holder 20, and cutting fluid is supplied from the small central hole 133 to the rear end of the fluid passage 66 via the tool holding hole 122. The cutting fluid flows through the fluid passage 66, is injected from the tip end (not shown) of the end mill 65, and reaches a workpiece. According to the embodiment of FIG. 9, the tool holder 20 includes the annular O-ring 43 that seals between the inner peripheral edge of the lid member 41 and the outer peripheral surface of the shank portion 61. Thus, the cutting fluid flowing from the small central hole 133 into the tool holding hole 122 can be prevented from leaking from the tip end of the tool attaching/detaching portion 12. In particular, the O-ring 43 is effective in the case where the grooves 126 described above are formed in the inner peripheral surface 12h of the tool holder 20.

The tool holder 20 according to this embodiment further includes a stopper member 51 provided on the bottom side of the tool holding hole 122. The stopper member 51 defines the axial position of the shank portion 61 of the end mill 65 inserted in the tool holding hole 122.

The stopper member 51 includes a fixing member 52 that is fixed to the inner peripheral surface 12h of the tool attaching/detaching portion 12, and an adjuster member 53 that is supported by the fixing member 52 so as to be displaceable in the axial direction and that abuts on the shank portion 61 of the end mill 65. An externally threaded portion 522 is formed in the outer peripheral surface of the fixing member 52, and is screwed in an internally threaded portion 12s formed in the inner peripheral surface 12h of the tool attaching/detaching portion 12 near the bottom of the tool holding hole 122. Thus, the fixing member 52 is attached and fixed to the tool holding hole 122. An annular groove is formed in the outer peripheral surface of the fixing member 52 at a position closer to the tip end than the externally threaded portion 522. An O-ring 55 as an annular sealing member is attached to the annular groove. The O-ring 55 is a first sealing member that seals between the tool holding hole 122 and the fixing member 52.

A central hole 523 is also formed so as to extend through the fixing member 52 in the axial direction, and the adjuster member 53 is attached and fixed to the central hole 523. The rear end side of the central hole 523 has a smaller diameter than the tip end side thereof, and an internal threaded portion 524 is formed in the rear end side of the central hole 523.

The adjuster member 53 is formed by a tip end 531 having a large diameter, a central portion 534 having a smaller diameter than the tip end 531, and a rear end 535 having a smaller diameter than the central portion 534, and is shaped so that three cylinders are coupled together in series. A communication passage 532 is formed in the center of the adjuster member 53 so as to extend through the adjuster member 53 in the axial direction. The opening at the rear end of the communication passage 532 connects to the small central hole 133. The opening at the tip end of the communication passage 532 connects to the opening at the rear end of the fluid passage 66 of the shank portion 61.

The adjuster member 53 has the tip end 531 having a large diameter, and the tip end 531 has a tip end face 533 having a large diameter. The tip end face 533 abuts on the rear end of the shank portion 61 of the end mill 65 inserted in the tool holding hole 122, so that the tip end face 533 surface contacts the rear end of the shank portion 61 of the end mill 65. The tip end face 533 thus defines the axial position of the shank portion 61. A ring groove is formed about the axis O in the tip end face 533, and an annular O-ring 57 is attached to the ring groove. The O-ring 57 is a third sealing member that contacts the rear end face of the shank portion 61 with no gap therebetween and seals between the tip end face 533 and the shank portion 61. Thus, the opening at the tip end of the communication passage 532, which is provided in the center of the tip end face 533, connects in a hermetically sealed manner to the opening at the rear end of the liquid passage 66, which is provided in the center of the rear end face of the shank portion 61.

An externally threaded portion is formed in the outer peripheral surface of the rear end 535 of the adjuster member 53, and is screwed in an internally threaded portion 524 of the fixing member 52. By such screwing, the axial position of the adjuster member 53 is adjusted as shown by broken line in FIG. 9 by rotating the adjuster member 53.

The central portion 534 of the adjuster member 53 is received by the tip end of the central hole 523 of the fixing member 52. An annular groove is formed in the outer peripheral surface of the central portion 534 of the adjuster member 53, and an O-ring 56 as an annular sealing member is attached to the annular groove. The O-ring 56 is a second sealing member that seals between the inner peripheral surface of the fixing member 52 and the outer peripheral surface of the adjuster member 53.

According to the embodiment shown in FIG. 9, the central hole 132 and the small central hole 133 as a fluid passage through which the cutting fluid flows extend from the mount portion 13 of the holder body 11 to the bottom 123 of the tool holding hole 122. The adjuster member 53 is attached and fixed to the central hole 523 that extends through the fixing member 52 in the axial direction. The adjuster member 53 has the communication passage 532 that allows the bottom 123 of the tool holding hole 122 to communicate with the opening of the tool holding hole 122, and the annular O-ring 57 that seals between the tip end face 533 as the axial tip end face of the adjuster member 53 and the rear end face of the shank portion 61 of the end mill 65. This allows the small central hole 133 of the holder body 11 to reliably communicate with the fluid passage 66 of the end mill 65 through the communication passage 532.

The fixing member 52 has the annular O-ring 55 that seals between the fixing member 52 and the tool holding hole 122. The adjuster member 53 has the annular O-ring 56 that seals between the peripheral wall surface of the central hole 523 and the adjuster member 53. Thus, the cutting fluid can be prevented from flowing out toward the through holes 22a, 22b.

A modification of the side lock chucking structure will be described below with reference to the longitudinal sectional view of FIG. 10. In the modification, an annular groove is formed in the outer-diameter portion 22m of the through hole 22a, and a snap ring 26 is attached and fixed to the annular groove. The snap ring 26 is a C-shaped retaining member that is located radially outward of the side lock bolt 23a, and that prevents the side lock bolt 23a from coming off outward (radially outward) from the through hole 22a. Thus, even if the side lock bolt 23a loosens during high-speed rotation of the tool holder 10, the side lock bolt 23a can be prevented from coming off from the through hole 22a. The snap ring 26 is also provided in the through hole 22b in a manner similar to that in the through hole 22a.

FIG. 10 shows the state where the side lock bolt 23a is rotated in the loosening direction so that the head portion 23m of the side lock bolt 23a abuts on the snap ring 26. Thus, if the side lock bolt 23a is moved radially outward, the tip end face 23t of the side lock bolt 23a withdraws out of the tool holding hole 122. According to this modification, the shank portion 61 having a cylindrical shape and having no abutting flat surface formed therein as a cut-out surface can be inserted into the tool holding hole 122. Note that the shank portion 61 can be held by the roll lock chucking structure 31.

Figure 11:
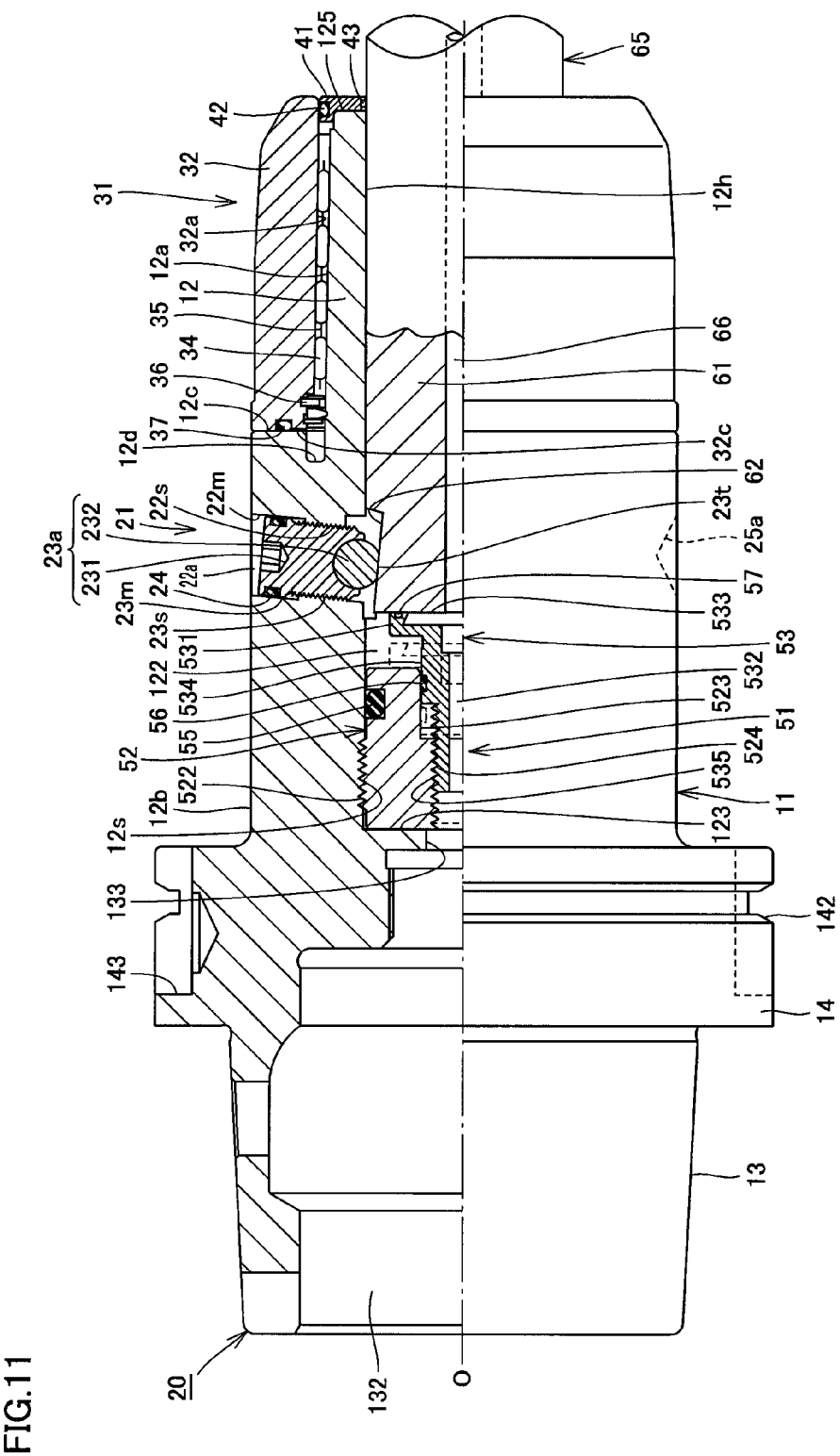
FIG. 11 is a longitudinal sectional view showing a side lock chucking structure according to another modification of the present invention.

Another modification of the side lock chucking structure will be described with reference to the longitudinal sectional view of FIG. 11. In the modification shown in FIG. 11, the side lock bolt 23a includes a bolt body 231 and a pressing member 232. The bolt body 231 has in its longitudinal rear end a head portion 23m having a large diameter, and has in its longitudinal central region an internally threaded portion 34s having a small diameter. A spherical recess is formed in the longitudinal tip end of the bolt body 231, and the pressing member 232 having a ball shape fits in the recess 23. A flat pressing surface 23t is formed at the tip end of the pressing member 232. Since the pressing member 232 is thus supported by the spherical surface of the bolt body 231, the pressing surface 23t can be rotated about the central axis of the bolt body 231, and can be tilted with respect to the central axis of the bolt body 231. Accordingly, orientation of the pressing member 232 with respect to the bolt body 231 can be changed as desired. In addition to the modification of FIG. 12, attachment of the pressing member 232 to the bolt body 231 may be implemented by any method such as a universal joint as long as the orientation of the pressing member 232 can be changed as desired.

When the bolt body 231 is screwed into the internally threaded portion 22s of the through hole 22a and is rotated in the fastening direction, the side lock bolt 23a advances into the tool holding hole 122, and the pressing surface 23t of the side lock bolt 23a abuts on the first flat surface 62. If the bolt body 231 is further rotated in the fastening direction, the pressing surface 23t changes its orientation according to the first flat surface 62, and surface contacts the first flat surface 62.

As described above, according to the modification of FIG. 11, even if the first flat surface 62 of the shank portion 61 is not exactly perpendicular to the direction in which the side lock bolt 23a advances, the pressing surface 23t of the pressing member 232 changes its orientation according to the first flat surface 62 of the shank portion 61, and surface contacts the first flat surface 62. Thus, the side lock bolt 23a firmly presses the first flat surface 62 of the shank portion 61, whereby the shank portion 61 can be more reliably chucked. The second side lock bolt 23b can be configured in a manner similar to that of the first side lock bolt 23a.

Figure 12:
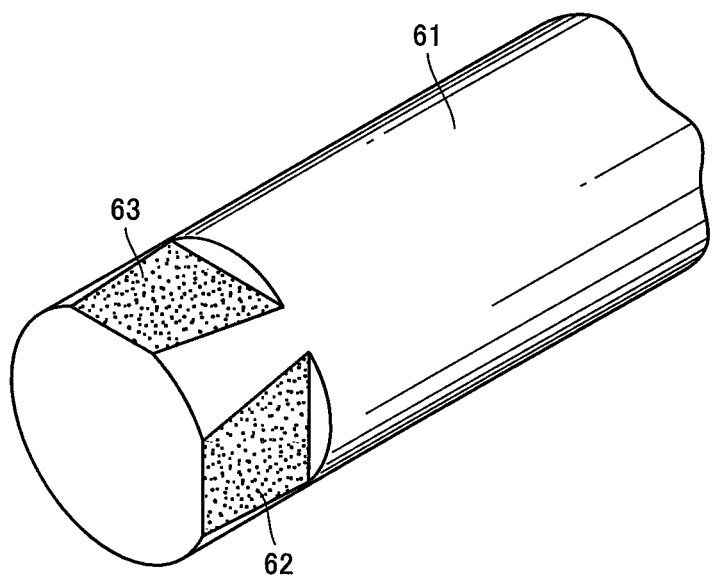
FIG. 12 is a perspective view showing a shank portion of an end mill according to a modification of the present invention.

A shank portion of an end mill according to a modification of the present invention will be described with reference to the perspective view of FIG. 12. In the modification shown in FIG. 12, the first flat surface 62 and the second flat surface 63 have been surface-treated so as to have a higher friction coefficient. Specifically, the first flat surface 62 and the second flat surface 63 have a fine concavo-convex profile by shot peening.

Shot peening is a cold processing method in which many particles are directed onto a surface to be processed, thereby forming many concaves and convexes on the surface to be processed. Since the first flat surface 62 and the second flat surface 63 which have been subjected to the shot peening have a residual compressive stress, fatigue life is increased.

As described above, according to the modification of FIG. 12, at least one of the first flat surface 62 and the second flat surface 63 has been surface-treated so as to have a higher friction coefficient. Accordingly, when the first flat surface 23*a* abuts on the side lock bolt 23*a*, the tip end face (the pressing surface) 23*t* of the side lock bolt 23*a* is less likely to slide on the first flat surface 62, whereby the side lock bolt 23*a* can reliably press the first flat surface 62. This makes it more difficult for the shank portion 61 to come off from the tool holder 10, 20.

Instead of surface-treating the first flat surface 62 and the second flat surface 63 in the manner described above, the tip end face (the pressing surface) 23*t* of the side lock bolt 23*a* may be surface-treated so as to have a higher friction coefficient. According to such a modification as well, the tip end face (the pressing surface) 23*t* of the side lock bolt 23*a* is less likely to slide on the first flat surface 62, whereby the side lock bolt 23*a* can reliably press the first flat surface 62. This makes it more difficult for the shank portion 61 to come off from the tool holder 10, 20. Moreover, in this modification, the processing is simpler as compared to the case where the first flat surface 62 and the second flat surface 63 are surface-treated in the manner described above. The tip end face (the pressing surface) of the side lock bolt 23*b* may also be surface-treated so as to have a higher friction coefficient.

Figure 13:
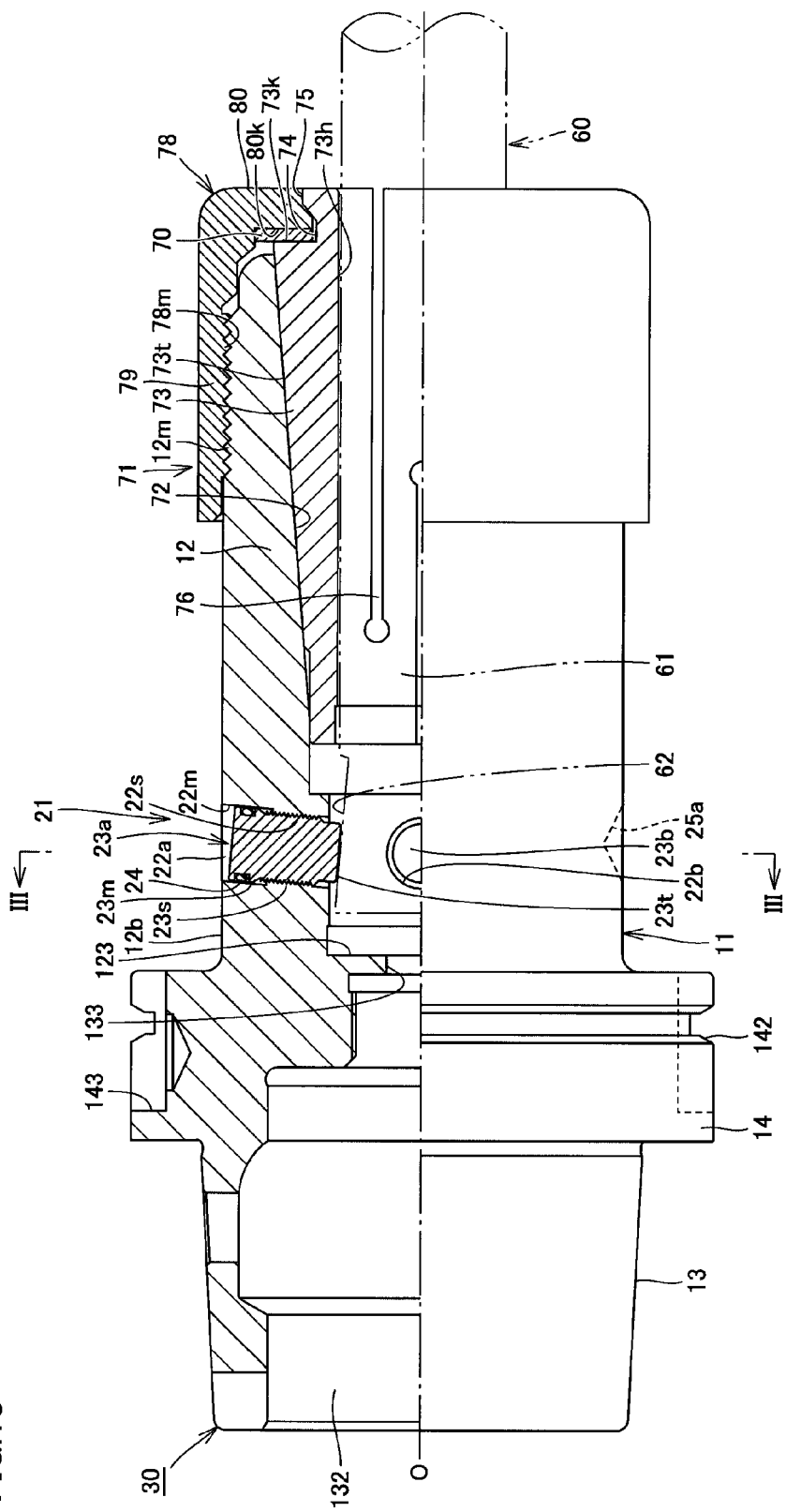
FIG. 13 is an overall view showing a tool holder according to still another embodiment of the present invention.

Still another embodiment of the present invention will be described below. FIG. 13 is an overall view showing a tool holder according to still another embodiment of the present invention. In FIG. 13, the upper half of the tool holder is shown by a longitudinal sectional view. In this embodiment, the same configurations as those of the above embodiments are denoted with the same reference characters, and description thereof is omitted. Configurations different from the above embodiments will be described below.

A tool holder 30 has a side lock chucking structure 21 and a taper collet chucking structure 71 in the tool attaching/detaching portion 12 as a structure that chucks the shank portion 61 of the end mill 60. The taper collet chucking structure 71 corresponds to a centering holding unit that centers and holds the shank portion 61 of the end mill 60. The side lock chucking structure 21 has a function to provide final fastening, namely a function to chuck the shank portion 61 of the end mill 60 which has been centered and held.

The taper collet chucking structure 71 has a tapered hole 72, a taper collet 73, a lock nut 78, and a plane bearing 70. The tapered hole 72 is formed in the tool attaching/detaching portion 12, and extends rearward from the tip end of the holder body 11 along the axis O. The inner diameter of the tapered hole 72 increases from the rear end of the tapered hole 72 toward the tip end thereof.

The taper collet 73 having a cylindrical shape fits in the tapered hole 72. The inner periphery of the taper collet 73 is a tool insertion hole 73*h*. The tool insertion hole 73*h* extends through the taper collet 73 from the rear end of the taper collet 73 to the tip end thereof in the axial direction. The shank portion 61 of the end mill 60 is inserted into the tool insertion hole 73*h* from the tip end side of the tool insertion hole 73*h*. A rear end portion of the outer periphery of the taper collet 73 is a tapered surface 73*t* whose diameter is reduced toward the rear end. The tapered surface 73*t* fits in the tapered hole 72.

A ring groove 74 is formed in the outer periphery of the taper collet 73, which adjoins the tip end of the tapered surface 73*t*, so as to extend along the entire circumference of the taper collet 73. An outer periphery 75 of the tip end of the taper collet 73 which adjoins the tip end of the ring groove 74 has a larger diameter than the ring groove 74. The side surface on the rear end side of the ring groove 74, i.e., the boundary between the ring groove 74 and the tapered surface 73*t*, forms an annular flat surface 73*k* perpendicular to the axis O.

The taper collet 73 has slit-shaped slots 76 extending parallel to the axis O. At least one of the slots 76 extends from the tip end of the taper collet 73 to an intermediate position thereof, and the remainder of the slots 76 extends from the rear end of the taper collet 73 to an intermediate position thereof. All the slots 76 are arranged at regular intervals in the circumferential direction. The diameter of the taper collet 73 can be changed by compressing the slots 76.

An internally threaded portion 78*m* is formed in the inner periphery of the lock nut 78 having a cylindrical shape, and an externally threaded portion 12*m* is formed in the outer periphery of the tool attaching/detaching portion 12. The internally threaded portion 78*m* is screwed on the externally threaded portion 77. The lock nut 78 is a member that is screwed on the holder body 11 to press the taper collet 73 toward the axial rear end. The taper collet 73 is pressed in the tapered hole 72, and the diameter of the tool insertion hole 73*h* is reduced.

The lock nut 78 has a cylindrical portion 79 and an inward flange portion 80. The cylindrical portion 79 has the internally threaded portion 78*m* formed in its inner periphery so as to be screwed on an externally threaded portion 12*m* formed in the outer periphery of the tip end of the holder body 11. The inward flange portion 80 is formed in the tip end of the cylindrical portion 79 so as to protrude radially inward. A flat surface 80*k* on the rear end side of the inward flange portion 80 is an annular flat surface extending at right angles to the axis O. The inner peripheral edge of the inward flange portion 80 engages with the ring groove 84 of the taper collet 73. The plane bearing 70 is inserted between the flat surface 80*k* on the rear end side of the inward flange portion 80 and the flat surface 73*k* of the taper collet 73.

The plane bearing 70 is a type of plain bearing that transmits a force in the direction of the axis O while reducing friction in the direction at right angles to the axis O, and is a plate material in the shape of a ring board having an outer diameter corresponding to the diameter of the inner periphery of the lock nut 78. The inner peripheral edge of the plane bearing 70 engages with the ring groove 74. The end face on the rear end side of the plane bearing 70 contacts the flat surface 73*k* of the taper collet 73, and the end face on the tip end side of the plane bearing 70 contacts the flat surface 80*k* on the rear end side of the flange portion 80. The plane bearing 70, which receives the pressing force in the direction of the axis O between the inward flange portion 80 and the taper collet 73, reduces the frictional resistance of both contact surfaces (the flat surface 80*k* and the flat surface 73*k*).

The shank portion 61 of the end mill 60 is held by the taper collet chucking structure 71 by screwing the internally threaded portion 78*m* on the externally threaded portion 12*m* and rotating the lock nut 78 in the fastening direction. Thus, the inward flange portion 80 presses the taper collet 73 toward the rear end via the plane bearing 70, and the tapered surface 73*t* closely fits in the tapered hole 72 of the holder body 11, whereby the diameter of the taper collet 73 is reduced, and the shank portion 61 of the end mill 60 is held.

At this time, since the plane bearing 70 is interposed between the flat surface 80*k* and the flat surface 73*k*, the frictional resistance of both contact surfaces that are in slide contact with each other is significantly reduced. Thus, the pressing force resulting from fastening the lock nut 78 is uniformly applied to the taper collet 73.

At this time, the taper collet 73 is aligned with the axis O of the holder body 11 according to the tapered hole 72.

As a result, the end mill 60 is centered without being tilted, and is held by the tool attaching/detaching portion 12 of the holder body 11.

Figure 14:
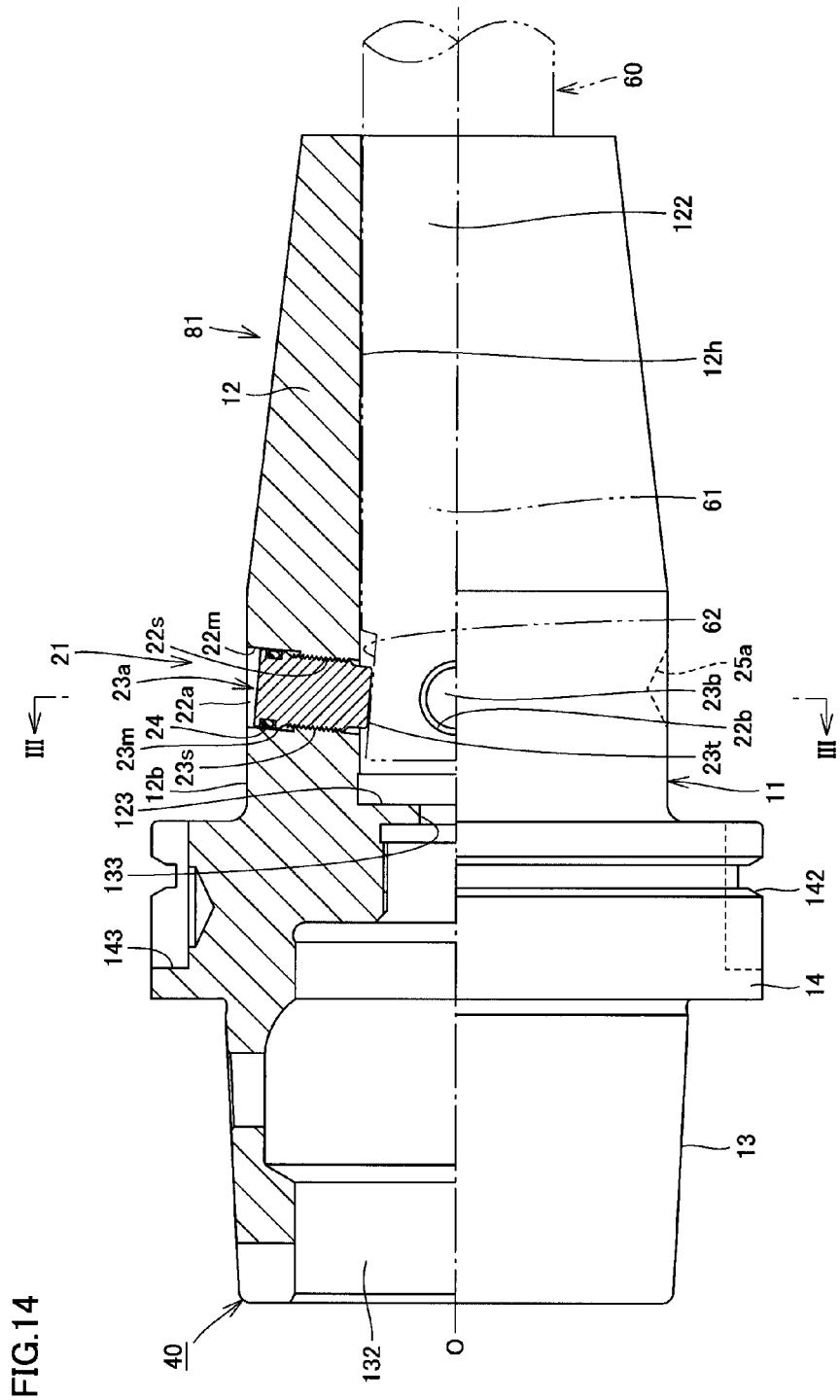
FIG. 14 is an overall view showing a tool holder according to a further embodiment of the present invention.

A further embodiment of the present invention will be described below. FIG. 14 is an overall view showing a tool holder according to a further embodiment of the present invention. In FIG. 14, the upper half of the tool holder is shown by a longitudinal sectional view. In this embodiment, the same configurations as those of the above embodiments are denoted with the same reference characters, and description thereof is omitted. Configurations different from the above embodiments will be described below.

A tool holder 40 has a side lock chucking structure 21 and a shrink-fit chucking structure 81 in the tool attaching/detaching portion 12 as a structure that chucks the shank portion 61 of the end mill 60. The shrink-fit chucking structure 81 corresponds to a centering holding unit that centers and holds the shank portion 61 of the end mill 60. The side lock chucking structure 21 has a function to provide final fastening, namely a function to chuck the shank portion 61 of the end mill 60 which has been centered and held.

When heated to a high temperature, a tip end region of the tool attaching/detaching portion 12 thermally expands, and the inner peripheral surface 12*h* thereof is increased in diameter and receives the shank portion 61 of the end mill 60. By subsequent cooling, the tip end region of the tool attaching/detaching portion 12 thermally contracts, and the inner peripheral surface 12*h* thereof is reduced in diameter and holds the shank portion 61. At this time, the end mill 60 is aligned with the axis O of the holder body 11. As a result, the end mill 60 is centered without being tilted, and is held by the tool attaching/detaching portion 12 of the holder body 11.

Figure 15:
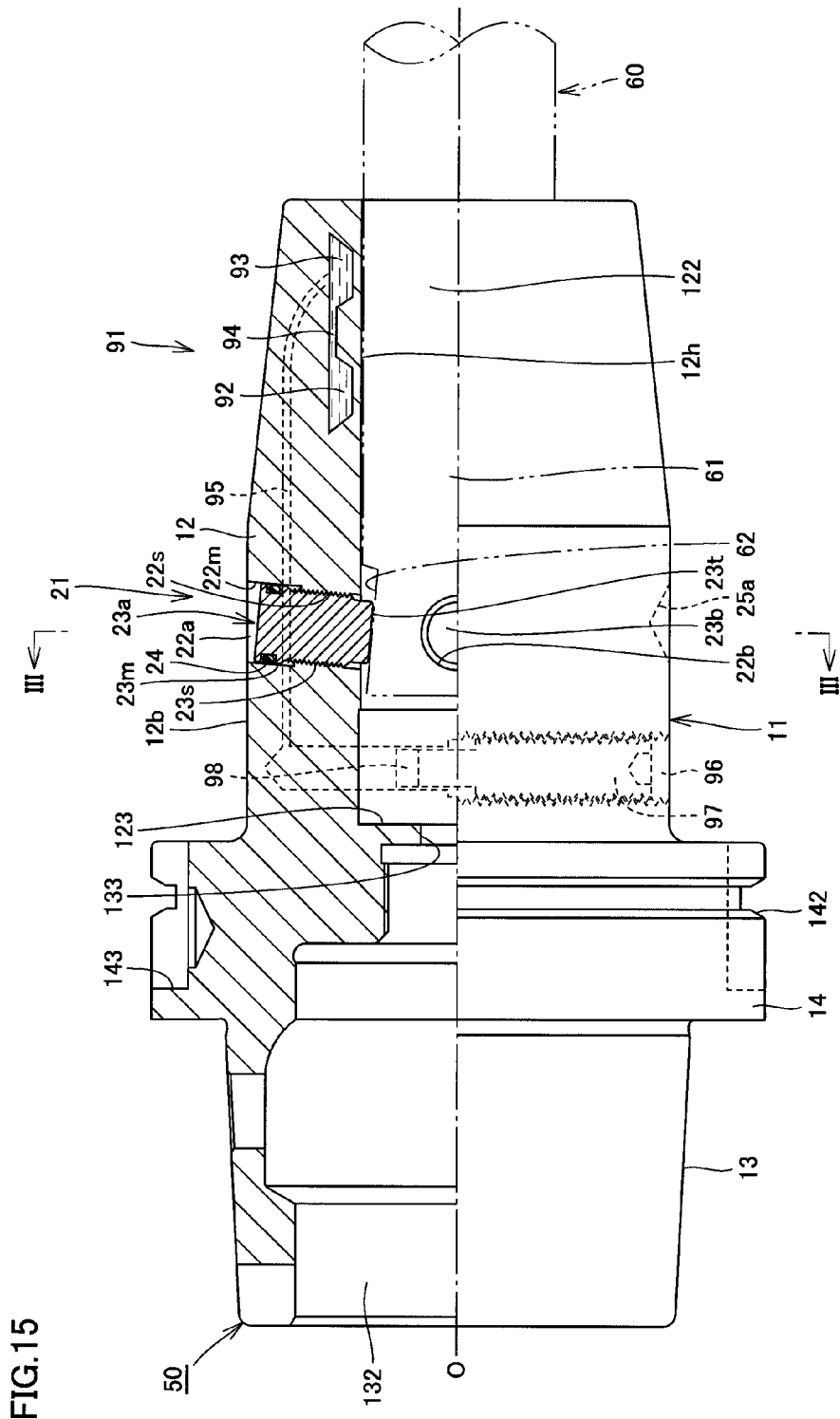
FIG. 15 is an overall view showing a tool holder according to a still further embodiment of the present invention.

A still further embodiment of the present invention will be described below. FIG. 15 is an overall view showing a tool holder according to a still further embodiment of the present invention. In FIG. 15, the upper half of the tool holder is shown by a longitudinal sectional view. In this embodiment, the same configurations as those of the above embodiments are denoted with the same reference characters, and description thereof is omitted. Configurations different from the above embodiments will be described below.

A tool holder 50 has a side lock chucking structure 21 and a hydro chucking structure 91 in the tool attaching/detaching portion 12 as a structure that chucks the shank portion 61 of the end mill 60. The hydro chucking structure 91 corresponds to a centering holding unit that centers and holds the shank portion 61 of the end mill 60. The side lock chucking structure 21 has a function to provide final fastening, namely a function to chuck the shank portion 61 of the end mill 60 which has been centered and held.

The hydro chucking structure 91 will be described below. Two hydraulic chambers 92, 93 are formed inside a tip end region of the tool attaching/detaching portion 12 so as to be separated from each other in the direction of the axis O. The hydraulic chamber 92 is a ring-shaped chamber provided near the inner peripheral surface 12*h* of the tool attaching/detaching portion 12 to surround the tool holding hole 122. The hydraulic chamber 93 is configured in a manner similar to that of the hydraulic chamber 92. The hydraulic chambers 92, 93 communicate with each other through a communication passage 94. A hydraulic supply passage 95 extending rearward from the hydraulic chamber 93 connects to a pressure cylinder portion 96 provided in a central portion in the axial direction of the holder body 11. In order to facilitate understanding, the hydraulic supply passage 95 and the pressure cylinder portion 96 are schematically shown by broken lines.

The pressure cylinder portion 96 is a bottomed hole formed in the holder body 11 from its outer peripheral surface. The bottom part of the pressure cylinder portion 96 is filled with hydraulic oil, and a male screw 97 is screwed in an internally threaded portion formed in the inner peripheral surface on the opening side of the pressure cylinder portion 96. The bottom part of the pressure cylinder portion 96 is sealed by a piston 98 attached to the tip end of the male screw 97.

When the male screw 97 is rotated in the fastening direction, the oil pressure in the pressure cylinder portion 96 is increased, and the hydraulic chambers 92, 93 expand radially inward in the tool attaching/detaching portion 12. Thus, the inner peripheral surface 12*h* is reduced in diameter near the hydraulic oil chambers 92, 93, and holds the shank portion 61. At this time, the end mill 60 is aligned with the axis O of the holder body 11. As a result, the end mill 60 is centered without being tilted, and is held by the tool attaching/detaching portion 12 of the holder body 11.

Figure 16:
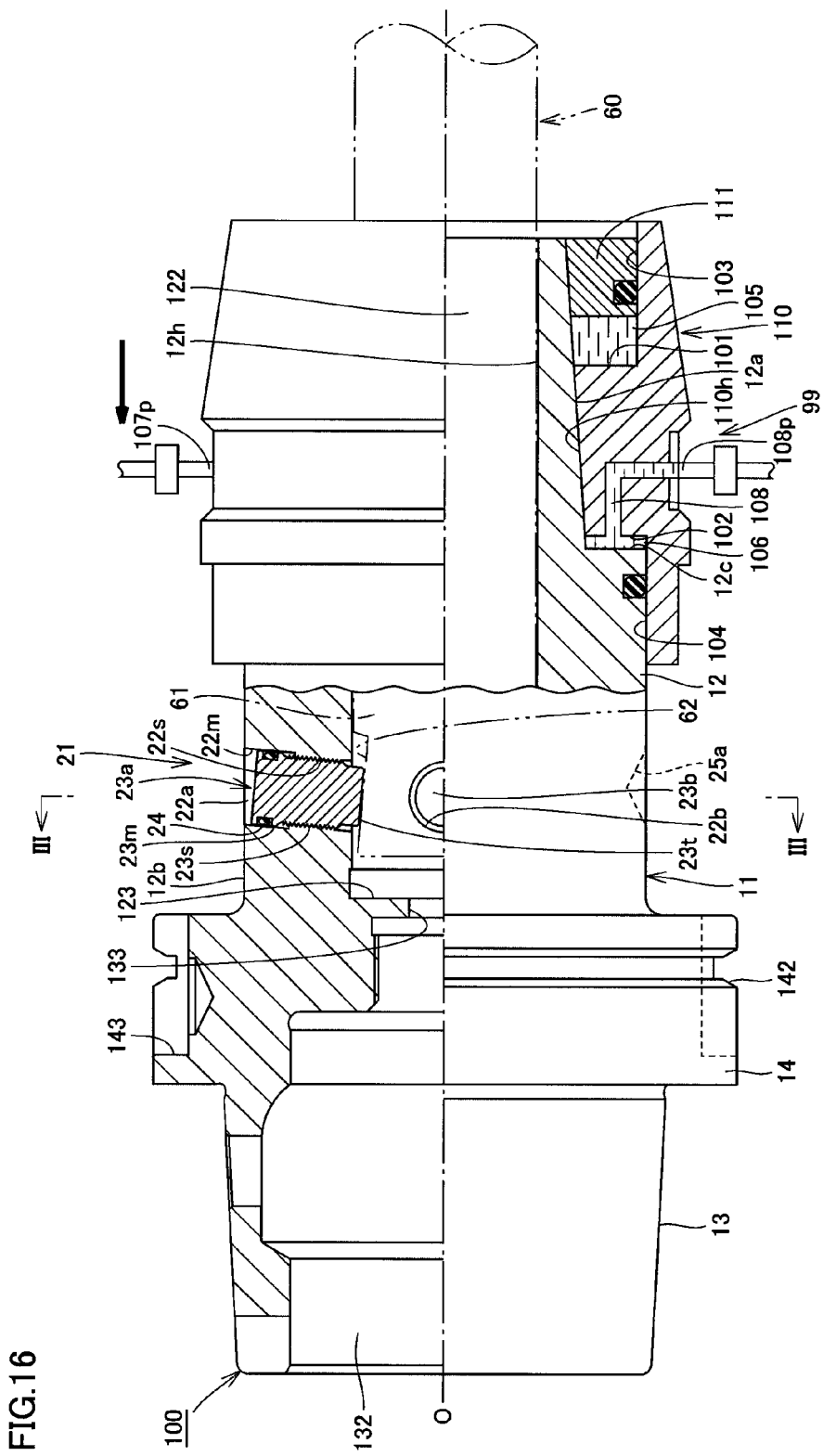
FIG. 16 is an overall view showing a tool holder according to a yet further embodiment of the present invention.
Figure 17:
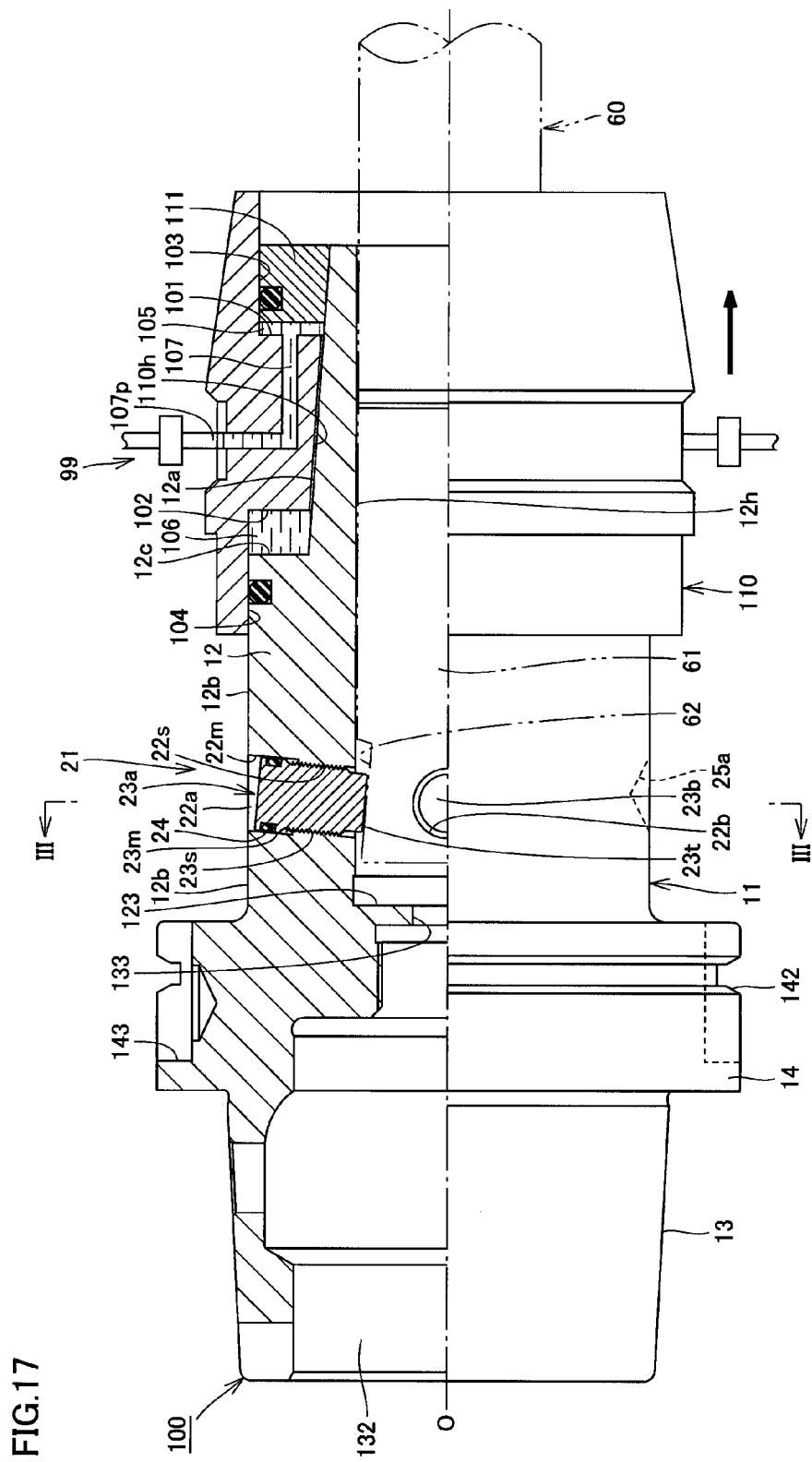
FIG. 17 is an overall view showing the state where the tool holder of FIG. 16 is not holding a shank portion.

A yet further embodiment of the present invention will be described below. FIG. 16 is an overall view showing a tool holder according to a yet further embodiment of the present invention, and shows the state where the tool holder of this embodiment is holding the shank portion of the end mill. FIG. 17 shows the state where the tool holder of this embodiment is not holding the shank portion of the end mill. In order to facilitate understanding, a part of the tool holder is shown by a longitudinal sectional view in FIG. 16, and the upper half of the tool holder is shown by a longitudinal sectional view in FIG. 17. In this embodiment, the same configurations as those of the above embodiments are denoted with the same reference characters, and description thereof is omitted. Configurations different from the above embodiments will be described below.

A tool holder 100 has a side lock chucking structure 21 and a chucking structure 99 such as CoroGrip (registered trademark) in the tool attaching/detaching portion 12 as a structure that chucks the shank portion 61 of the end mill 60. The chucking structure 99 corresponds to a centering holding unit that centers and holds the shank portion 61 of the end mill 60. The side lock chucking structure 21 has a function to provide final fastening, namely a function to chuck the shank portion 61 of the end mill 60 which has been centered and held.

The chucking structure 99 will be described below. A cylindrical member 110 has a tapered hole 110*h* whose inner peripheral surface has the same gradient as the tip end outer peripheral surface 12*a* of the tool attaching/detaching portion 12, and the cylindrical member 110 contacts the tip end outer peripheral surface 12*a*. A stopper ring 111 is attached and fixed to the tip end of the tip end outer peripheral surface 12*a*, so that the cylindrical member 110 does not come off toward the tip end.

The inner peripheral surface of the cylindrical member 110 includes a first annular flat surface 101, a first inner peripheral surface 103, a second annular flat surface 102, and a second inner peripheral surface 104. The first annular flat surface 101 connects to the tip end part of the tapered hole 110*h* and faces toward the tip end. The first inner peripheral surface 103 extends further toward the tip end from the first annular flat surface 101. The second annular flat surface 102 connects to the rear end part of the tapered hole 110*h* and faces toward the rear end. The second inner peripheral surface 104 extends further toward the rear end from the second annular flat surface 102.

The first cylindrical surface 103 contacts the outer peripheral surface of the stopper ring 111, and a first hydraulic chamber 105 is defined between the first annular flat surface 101 and the stopper ring 111. An oil passage 107 and a port 107p, which connect to the first hydraulic chamber 105, are provided in the cylindrical member 110.

The second cylindrical surface 104 contacts the rear end outer peripheral surface 12b of the holder body 11, and a second hydraulic chamber 106 is defined between the second annular flat surface 102 and the annular stepped surface 12c. An oil passage 108 and a port 108p, which connect to the second hydraulic chamber 106, are provided in the cylindrical member 110.

In order to hold the shank portion 61 of the end mill 60 by the chucking structure 99, a pump is prepared, and as shown in FIG. 16, an oil pressure is supplied from the pump to the port 107p to expand the hydraulic chamber 105. Thus, the cylindrical member 110 moves rearward as shown by arrow in FIG. 16, whereby hydraulic fluid in the second hydraulic chamber 106 is discharged from the port 108p, and the tapered hole 110h of the cylindrical member 110 closely fits on the tip end outer peripheral surface 12a. Thus, due to the wedging action of the tapered hole 110h and the tapered outer peripheral surface 12a, the outer peripheral surface 12a is strongly pressed radially inward along its entire circumference and is reduced in diameter. As a result, the tool holding hole 122 formed in the center of the tool attaching/detaching portion 12 is also reduced in diameter, and the cylindrical portion as the front part of the shank portion 61 inserted in the tool holding hole 122 is fastened uniformly along its entire circumference by the inner peripheral surface 12h. Accordingly, the tool attaching/detaching portion 12 holds the outer peripheral surface of the shank portion 61 uniformly in the circumferential direction. At this time, the axis of the holder body 11 is aligned with the axis of the end mill 60, and the end mill 60 is held with high accuracy along the axis O.

As a result, the end mill 60 is centered without being tilted, and is held by the tool attaching/detaching portion 12 of the holder body 11.

An releasing operation for releasing the shank portion 61 from the chucking structure 99 is an inverted manner from the holding operation for holding the shank portion 61. Specifically, as shown in FIG. 17, an oil pressure is supplied from the pump to the port 108p to expand the second hydraulic chamber 106. Thus, the cylindrical member 110 moves forward as shown by arrow in FIG. 17.

Although the embodiments of the present invention are described with reference to the drawings, the present invention is not limited to the illustrated embodiments. Various modifications and variations can be made to the illustrated embodiments without departing from the spirit and scope of the present invention.

The shank structure of the end mill and the tool holder according to the present invention are advantageously used in machine tools.

The invention claimed is:

1. A shank structure of an end mill, comprising:
a shank portion for being inserted in a tool holding hole of a tool holder, and for being chucked in a manner of being centered and held by reducing a diameter of the tool holding hole along a predetermined axial dimension of the tool holding hole, wherein
first and second flat planar surfaces are provided on an outer periphery of an axial rear end part of the shank portion that terminates at a rear end of the shank portion, and the first and second flat planar surfaces are circumferentially offset from one another by a circumferential angle in a range from 60 to 120 degrees, both inclusive, around an axis of the shank portion, so that the first and second flat planar surfaces are arranged and adapted to abut on side lock bolts attached to a body of the tool holder,
a cylindrical part is formed on an outer periphery of the shank portion, and the cylindrical part has a circular cross section with a constant radius along a predetermined axial dimension of the shank portion, and the cylindrical part is located closer to an axial tip end of the end mill than the first and second flat planar surfaces, wherein the axial tip end and the rear end are at axially opposite ends of the end mill, and wherein the cylindrical part is arranged and adapted to be fastened by the inner peripheral surface of the tool holding hole of which the diameter is reduced,
the first and second flat planar surfaces are tilted at a predetermined tilt angle in a range from 1 to 10degrees, both inclusive, with respect to the axis of the shank portion so as to face toward the tip end of the end mill.

2. The shank structure of the end mill according to claim 1, wherein the first and second flat surfaces are surface-treated so as to have a higher friction coefficient than other surface areas of the shank structure that are not so surface treated.

3. The shank structure of the end mill according to claim 1, further having a fluid passage extending in the end mill from the shank portion toward the tip end of the end mill.

4. An end mill that extends longitudinally along an axis from a rear end of said end mill to a tip end of said end mill, wherein:
said rear end and said tip end are longitudinally opposite one another along said axis,
said end mill includes a shank portion terminating at said rear end and a cutting portion terminating at said tip end,
said shank portion has a first flat planar surface and a second flat planar surface that are each respectively tilted at a tilt angle from 1 to 10 degrees relative to said axis, with a vertex of said tilt angle oriented toward said tip end along said axis,
said first flat planar surface and said second flat planar surface are circumferentially offset from one another at a circumferential offset angle from 60 to 120degrees around said axis, wherein said circumferential offset angle is defined as spanning circumferentially from a first reference line to a second reference line, wherein said first reference line extends radially from said axis to a circumferential center of said first flat planar surface, and wherein said second reference line extends radially from said axis to a circumferential center of said second flat planar surface, and
said shank portion further has a cylindrical surface having a constant radius around said axis and having a predetermined axial length along said axis at a location axially between said cutting portion and said first and second flat planar surfaces.

5. The end mill according to claim 4, wherein the first and second flat surfaces have a roughened surface texture with a higher friction coefficient compared to other surface areas of said shank portion without said roughened surface texture.

6. The end mill according to claim 4, further having a fluid passage extending in said end mill from said rear end toward said tip end.

7. The end mill according to claim 4, wherein said circumferential offset angle is in a range from 80 to 100 degrees.

8. The end mill according to claim 4, wherein said circumferential offset angle is 90 degrees.

* * * * *